(12) United States Patent
Nakatani et al.

(10) Patent No.: US 6,657,928 B1
(45) Date of Patent: Dec. 2, 2003

(54) DISC PLAYER WITH FLOATING LOCK MECHANISM AND SELECT MECHANISM

(75) Inventors: Mitsuo Nakatani, Tokyo (JP); Motonori Hoshino, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

(21) Appl. No.: 09/577,995

(22) Filed: May 25, 2000

(30) Foreign Application Priority Data

May 25, 1999 (JP) ........................................ P. 11-145668

(51) Int. Cl.$^7$ ............................................... G11B 21/08
(52) U.S. Cl. ................................................... 369/33.01
(58) Field of Search ........................... 369/33.01, 75.2, 369/184, 187, 75.1, 247, 263; 360/97.02

(56) References Cited

U.S. PATENT DOCUMENTS

| | | | | |
|---|---|---|---|---|
| 4,507,771 A | * | 3/1985 | Tanaka | 369/215 |
| 4,797,866 A | | 1/1989 | Yoshikawa | 369/44.14 |
| 5,313,351 A | | 5/1994 | Lee | 360/99.07 |
| 5,636,198 A | | 6/1997 | Maeng | 369/191 |
| 5,974,017 A | * | 10/1999 | Niioka et al. | 369/75.1 |
| 6,201,781 B1 | * | 3/2001 | Abe | 369/247 |
| 6,339,575 B1 | * | 1/2002 | Suzuki | 369/77.1 |
| 6,359,854 B1 | * | 3/2002 | Nakanishi et al. | 369/178.01 |

FOREIGN PATENT DOCUMENTS

| | | |
|---|---|---|
| EP | 0 557 975 A2 | 9/1993 |
| EP | 0 926 667 A2 | 6/1999 |
| JP | 61-177687 | 8/1986 |

OTHER PUBLICATIONS

Eurpean Search Report and Communication dated May 9, 2001.

* cited by examiner

Primary Examiner—Julie Anne Watko
(74) Attorney, Agent, or Firm—McGinn & Gibb, PLLC

(57) ABSTRACT

An idler plate 14 turns in accordance with a rotational direction of a worm wheel (drive gear) 12, which constantly engages with a worm 11 provided on a shaft of a loading motor 10. Three idler gears 15 to 17, which constantly engage with the worm wheel 12, are provided on an idler plate (select member) 14. The idler plate 14 couples a select control idler gear 15 to a select control mechanism 2 and a transport roller idler gear 16 to a transport-roller drive mechanism 3 at a disc introducing position, and couples a pickup feeding idler gear 17 to a pickup feeding mechanism 4 at a pickup feeding position.

27 Claims, 23 Drawing Sheets

DISC PLAYER WITH FLOATING LOCK MECHANISM AND SELECT MECHANISM

BACKGROUND OF THE INVENTION

1. Field of the Invention

The present invention relates to a disc player, and more particularly to techniques for simplifying a mechanical construction for driving a pickup feeding mechanism which moves an optical pickup for reading information from an optical disc in a radial direction of the disc, and for simplifying a mechanical construction for detecting a mechanism status.

2. Description of the Related Art

The disc player for reading information from a disc (optical disc), such as a CD player, basically includes a disc rotating mechanism for rotating a disc on a turntable, a disc introducing mechanism for introducing the disc onto the turntable of a disc drive portion, and a pickup feeding mechanism for moving an optical pickup for reading information from the disc in a radial direction of the disc.

Three motors are respectively provided for those three mechanisms, and independently drive the latter. Quick response and high speed are essential to the performance of the disc rotating mechanism. To satisfy the requirements, the disc rotating mechanism is driven by a disc rotating mechanism motor directly coupled to the turntable.

The disc introducing mechanism sequentially moves the disc in vertical and horizontal directions with respect to a plane of the turntable. Therefore, the mechanism generally includes two types of operating members, a transport roller for transporting the disc onto the turntable along a horizontal plane, and a damper member for chucking the disc onto the turntable, and a shift plate for selectively controlling the two operating members. A disc introducing mechanism motor rectilinearly moves a shift plate to selectively control the transport roller or the damper member and to drive the transport roller to turn.

High precision is essential to the pickup feeding mechanism. Therefore, the optical pickup is rectilinearly moved with high precision by a lead screw engaging with the optical pickup, and the lead screw is driven to rotate by a pickup feeding mechanism motor located near the lead screw.

To select the driving of those mechanisms and an operation mode of a control circuit/signal processing circuit smoothly and at proper timings, the disc player includes plural kinds of detecting elements, such as detector sensor and detector switch. Specific examples of those detecting elements are a disc detecting element for detecting the insertion of a disc, a chucking end detecting element for detecting a chucking operation end in the disc introducing mechanism, and a pickup position detecting element for detecting that the optical pickup is at a disc inner-rim side position. Those detecting elements are used for the starting/stopping commands for drive selection of those mechanisms in the following ways.

A signal derived from a disc detecting element is used for a start command of starting up a disc introducing mechanism motor at the time of disc loading, and a stop command for stopping the disc introducing mechanism motor at the time of disc ejection, and others. A signal derived from the chucking end detecting element is used for a start command for the pickup feeding mechanism motor when a disc loading mode is shifted to a disc reproduction mode, a stop command for the disc introducing mechanism motor, and others. A signal derived from the pickup position detecting element is used for a start signal for the disc rotating mechanism motor in a disc reproduction mode, a stop signal for the disc rotating mechanism motor when the disc reproduction mode is shifted to the disc ejecting mode, a start signal for the disc introducing mechanism motor, and others.

The "disc inner-rim side position" of the optical pickup, which is to be detected by the pickup position detecting element is a position at which the optical pickup may read TOC (table of contents) information as management information stored in the disc inner-rim side area (lead-in area) of a disc recording area. In the disc reproduction mode, the optical pickup first reads the TOC information recorded in the lead-in area of the disc at this disc inner-rim side position, and a disc reproducing operation starts on the basis of the TOC information. The pickup position detecting element is provided for detecting that the optical pickup is at such a disc inner-rim side position.

The conventional disc player described above suffers from problems of requiring a large number of motors and detecting elements, and construction complexity.

In the conventional construction in which drive motors are respectively provided for the disc rotating mechanism, disc introducing mechanism and pickup feeding mechanism, three motors are required. In the mechanism, use of the three motors increases the number of component parts inclusive of motor support members and drive force transmission members, makes the related structure complicated, requires large parts occupying spaces, restricts the layout and design of related members, and brings about increase of the overall mechanism size and complexity of construction. The number of wires is also increased since electric power is supplied to the motors and those motors are controlled independently. Cost of the motors is relatively large in the cost of the overall mechanism. Thus, the use of three motors hinders the effort of reducing cost to manufacture.

In the conventional disc player, the three mechanisms are driven by their own motors, respectively. Accordingly, at least three detecting elements, a disc detecting element, a chucking end detecting element, and a pickup position detecting element, are required for the drive selection of the mechanism. Where the three kinds of detecting elements are used, the number of the wires for the detecting elements is increased. While the detecting element occupies a less space, the increase of the elements restricts the layout and design of related members, and makes the overall mechanism complicated.

SUMMARY OF THE INVENTION

An object of the invention is to solve the technical problems as mentioned above and to provide a disc player which reduces the number of the motors and the detecting elements and the number of related members inclusive of wires, and has advantages of improvement of parts layouts and design freedom, size reduction and simplification of the overall mechanism, cost reduction, and the like.

To solve the above problems, according to the present invention, a disc introducing mechanism or a pickup feeding mechanism are selectively driven by a single drive source, thereby succeeding in reducing the number of required drive sources.

Specifically, a disc player according to the invention basically includes a disc rotating mechanism for rotating a disc on a turntable, a disc introducing mechanism for introducing the disc onto the turntable of a disc drive portion, and a pickup feeding mechanism for moving an optical pickup for reading information on an optical disc in a radial direction of the disc.

In a disc player according to a first aspect of the invention, a disc positioning mechanism for positioning for positioning the disc on the turntable in accordance with a diameter of the disc is provided on the base member. The base member is supported on a chassis by an elastic member, and a floating lock mechanism is provided for fixing the base member at a fixed position on the chassis.

Thus, the disc positioning mechanism, together with the disc rotating mechanism, the disc introducing mechanism and the pickup feeding mechanism, are provided on the base member to be put in a floating state. Accordingly, it is little displaced when it is locked with the floating lock mechanism.

According to a second aspect of the present invention, the disc positioning mechanism includes a disc stopper for positioning the disc on the turntable, the disc stopper being urged by a disc introduced by the disc introducing mechanism to be movable, a lock portion being movable between a lock position for locking the disc stopper at a position based on a diameter of the disc and a lock removal position allowing the disc stopper to move, and a sensor portion for detecting a diameter of the disc by its contact with the disc, thereby controlling the lock portion.

In the disc player thus constructed, when a diameter of a disc introduced by the disc introducing mechanism requires a movement of the disc stopper, the sensor portion moves the lock portion to the lock removal position. In turn, the disc stopper is moved to a position corresponding to the disc diameter by the urging force of the introduced disc. When the sensor portion returns the lock portion to the lock position, the disc stopper stops to position the disc on the turntable. When the diameter of the disc introduced by the disc introducing mechanism does not require the movement of the disc stopper, the sensor portion locks the lock portion at the lock position. Accordingly, the introduced disc is stopped by the disc stopper to be positioned on the turntable. Thus, the disc player automatically recognizes a disc diameter and positions the disc on the turntable, without any special drive source.

According to a third aspect of the present invention, the disc player further comprises a select mechanism for selectively transmitting a drive force from a single drive source to the disc introducing mechanism or the pickup feeding mechanism.

Thus, the disc player is capable of driving both the disc introducing mechanism and the pickup feeding mechanism by the utilization of a drive force of a single drive source, by use of the select mechanism.

According to a fourth aspect of the invention, the select mechanism, the disc introducing mechanism and the pickup feeding mechanism are arranged as follows. The select mechanism includes a select member movable between a disc introducing position for transmitting a drive force to the disc introducing mechanism and a pickup feeding position for transmitting a drive force to the pickup feeding mechanism. The disc introducing mechanism includes disc introducing locking means for locking the select member at the disc introducing position in a disc introducing operation. The pickup feeding mechanism includes pickup feed locking means for locking the select member at the pickup feeding position in a pickup feeding operation.

In the disc player thus constructed, in the disc loading/ejecting operation, the select member is locked at the disc introducing position by the disc introducing locking means, where the coupling of the disc introducing mechanism with the drive side is reliably maintained. In the disc reproduction operation and when the optical pickup is returned to the original position, the select member is locked at the pickup feeding position by the pickup feeding locking means, whereby the coupling of the pickup feeding mechanism with the drive side is reliably maintained.

According to a fifth aspect of the invention, the disc introducing locking means is provided at a part of an operating member forming the disc introducing mechanism, and removes the locking of the select member when the operating member reaches an operation end position.

In the thus constructed disc player, in the disc loading/ejecting operation, the select member is locked at the disc introducing position by the operating member forming the disc introducing mechanism, whereby the coupling of the disc introducing mechanism with the drive side is reliably maintained. At the end of the operation of the operating member, its locking state is remove to allow the disc introducing mechanism from being separated from the drive side, and allow the select member to move to the pickup feeding position.

According to a sixth aspect of the invention, the disc introducing locking means is provided at a part of a select control member for selectively controlling the chucking of the disc to the turntable, and removes the locking of the select member when the operating member reaches a chucking end position.

In the thus constructed disc player, in the disc loading/ejecting operation, the select member is locked at the disc introducing position by the select control member, whereby the disc introducing mechanism with the drive side is reliably maintained. At the end of the chucking, its locking state is removed by the select control member to separate the disc introducing mechanism from the drive side, and to allow the select member to move to the pickup feeding position.

According to a seventh aspect of the invention, the optical pickup is positioned at the disc innermost position located more innerly than a disc inner-rim position allowing the optical pickup to read information in an inner area of an information recording area of the disc when the disc introducing mechanism operates, and when the optical pickup is at the disc innermost position, the pickup feeding locking means is held on the locking removal side, and when the optical pickup is located at the disc inner-rim side position and outside the disc inner-rim side position as radially viewed, the pickup feeding locking means is released and locks the select member at a pickup feeding position by the pickup feeding locking means.

In the thus constructed disc player, in the disc reproduction operation and when the optical pickup is returned to the original position, the select member is locked at the pickup feeding position by the pickup feeding mechanism, whereby the coupling of the pickup feeding mechanism with the drive side is reliably maintained. When the optical pickup reaches a position more innerly than a disc inner-rim side position during its returning operation, its locking state is removed to allow the pickup feeding mechanism from the drive side and allow the select member to move to the disc introducing position.

According to an eighth aspect of the invention, a detecting element for detecting that the optical pickup is at a disc inner-rim side position where the optical pickup may read information in an inner area of the information recording area of the disc, and detects the end of chucking the disc on the turntable by the utilization of an operation of the optical pickup.

This disc player is capable of detecting a chucking operation end in the disc introducing mechanism and a position of the optical pickup by use of a single detecting element. Therefore, the number of detecting elements is reduced when comparing with the disc player using the detecting elements for the respective mechanisms.

According to a ninth aspect of the invention, the optical pickup is positioned at the disc innermost position more innerly than the disc inner-rim side position when the disc introducing mechanism operates, and the detecting element detects the disc chucking operation end during a period that after the operation of the disc introducing mechanism ends, the optical pickup moves outward from the disc innermost position and reaches a position outside the disc inner-rim side position as radially viewed, and detects that the optical pickup is at a disc inner-rim side position during a period that the optical pickup moves toward the disc inner-rim side and reaches the disc inner-rim side position.

In this disc player, when the disc loading operation is shifted to the disc reproduction operation, the optical pickup is moved to a position somewhat outside the disc inner-rim side position as radially viewed. Thereafter, the optical pickup is returned to the disc inner-rim side position, thereby effecting the detection of the disc inner-rim side position of the optical pickup. Therefore, the chucking end and the position of the optical pickup can both be detected by merely adding a reciprocal motion of small distance in the vicinity of the disc inner-rim side position when the optical pickup is moved outward.

According to a tenth aspect of the invention, the select mechanism, the disc introducing mechanism, the pickup feeding mechanism, and the pickup feeding mechanism are arranged as follows. The select mechanism includes a select member movable between a disc introducing position for transmitting a drive force to the disc introducing mechanism and a pickup feeding position for transmitting a drive force to the pickup feeding mechanism. The disc introducing mechanism includes disc introducing locking means for locking the select member at the disc introducing position in a disc introducing operation. The pickup feeding mechanism includes pickup feed locking means for locking the select member at the pickup feeding position in a pickup feeding operation. When the optical pickup is at the disc innermost position, the pickup feeding locking means is held on the locking removal side. When the optical pickup is located at the disc inner-rim side position and outside the disc inner-rim side position as radially viewed, the pickup feeding locking means is released and locks the select member at a pickup feeding position by the pickup feeding locking means.

In the thus constructed disc player, in the disc loading/ejecting operation, the select mechanism is locked at the disc introducing position by the disc introducing locking means, whereby the coupling of the drive side with the disc introducing mechanism is reliably maintained. In the disc reproduction operation and when the optical pickup is returned to the original position, the select mechanism is locked at the pickup feeding position by the pickup feeding locking means, whereby the coupling of the drive with the pickup feeding mechanism is reliably maintained. At the end of the disc reproduction operation, the pickup feeding mechanism is reliably separated from the drive side by the utilization of the operation of the optical pickup. After the disc loading operation ends and the optical pickup reaches a disc inner-rim side position, the coupling of the drive side with the pickup feeding mechanism is reliably maintained by the pickup feeding locking means. Therefore, even if the optical pickup is returned to the disc inner-rim side position after the chucking operation ends, there is no chance that the pickup feeding mechanism is, against user's will, separated from the drive side. Accordingly, following the pickup position detection, the optical pickup is moved outward with certainty. Good disc reproduction operation starts well.

According to an eleventh aspect of the invention, the detecting element is a detector switch is pressed by the optical pickup when the optical pickup is within a range from the disc innermost position to the disc inner-rim side position, and is separated from the optical pickup when the optical pickup moves outside the disc inner-rim position as radially viewed.

In this disc player, a position of the operating optical pickup can mechanically and reliably be detected by the detector switch.

According to a twelfth aspect of the invention, the pickup feeding mechanism includes a lead screw engages one end of the optical pickup to rectilinearly moves the optical pickup, and the detecting element is disposed on the opposite side of the optical pickup.

In this device, the detecting element is disposed a place on the opposite side of the lead screw, in which a free space is relatively large in the peripheral portion of the optical pickup. Freedom of laying out the elements is high, and it little affects the layout and design of other members.

According to a thirteenth aspect of the invention, the select mechanism includes a drive gear, an idler plate, and an idler gear as specified in the following. The drive gear is constantly coupled to the single drive source, and being rotated by a drive force of the drive source. The idler plate is provided as the select member, and is turned between a disc introducing position and a pickup feeding position by a friction interacting between it and the drive gear in accordance with a rotational direction of the drive gear. The idler gear is attached to one end of the idler gear so as to be constantly coupled to the drive gear, and is arranged such that the idler gear revolves with respect to the drive gear with the turn of the idler gear, when the idler gear is at the disc introducing position, the idler gear is coupled to the disc introducing mechanism, and when the idler plate is at the pickup feeding position, the idler gear is coupled to the pickup feeding mechanism.

The position of the idler plate is changed by a simple construction including the drive gear, idler plate and idler gear, and either of the disc introducing mechanism or the pickup feeding mechanism is reliably coupled to the drive source depending on the changed position.

According to a fourteenth aspect of the invention, the idler gear includes a disc introducing idler gear to be coupled to the disc introducing mechanism when the idler plate is at the disc introducing position, and a pickup feeding idler gear, provided separately from the disc introducing idler gear, to be coupled to the pickup feeding gear when the idler plate is at the pickup feeding position.

In this disc player, the idler gears may be located at appropriate positions to the disc introducing mechanism and the pickup feeding mechanism, thereby increasing design freedom.

According to a fifteenth aspect of the invention, the disc introducing mechanism and the idler gear are constructed as follows. The disc introducing mechanism includes a select control mechanism include a select control mechanism and a transport roller drive mechanism as constructed in the following. The select control mechanism selectively controls a damper member for chucking the disc on said turntable between the chucking side and the releasing side, and selectively controlling a transport roller for transporting the disc onto the turntable along a horizontal plane between a disc contact side and a disc releasing side. The transport roller drive mechanism drives the transport roller to turn. The idler gear includes a select control idler gear, transport roller drive idler gear, and a pickup feeding idler gear. The select control idler gear to be coupled to the select control mechanism when the idler plate is at the disc introducing position. The transport roller drive idler gear is provided separately from the select control idler gear, to be coupled to the transport roller drive mechanism when the idler plate is at the disc introducing position. The pickup feeding idler gear, provided separately from the select control idler gear and the transport roller drive idler gear, to be coupled to the pickup feeding idler gear when the idler plate is at the pickup feeding position.

In this disc player, the idler gears may be located at appropriate positions to the select control mechanism, the transport roller drive mechanism, and the pickup feeding mechanism, respectively. Therefore, design freedom is increased.

DETAILED DESCRIPTION OF THE PRESENT INVENTION

The present invention will be described in detail with reference to the accompanying drawings.

FIRST EMBODIMENT

1.1 Construction

Figure 1A:
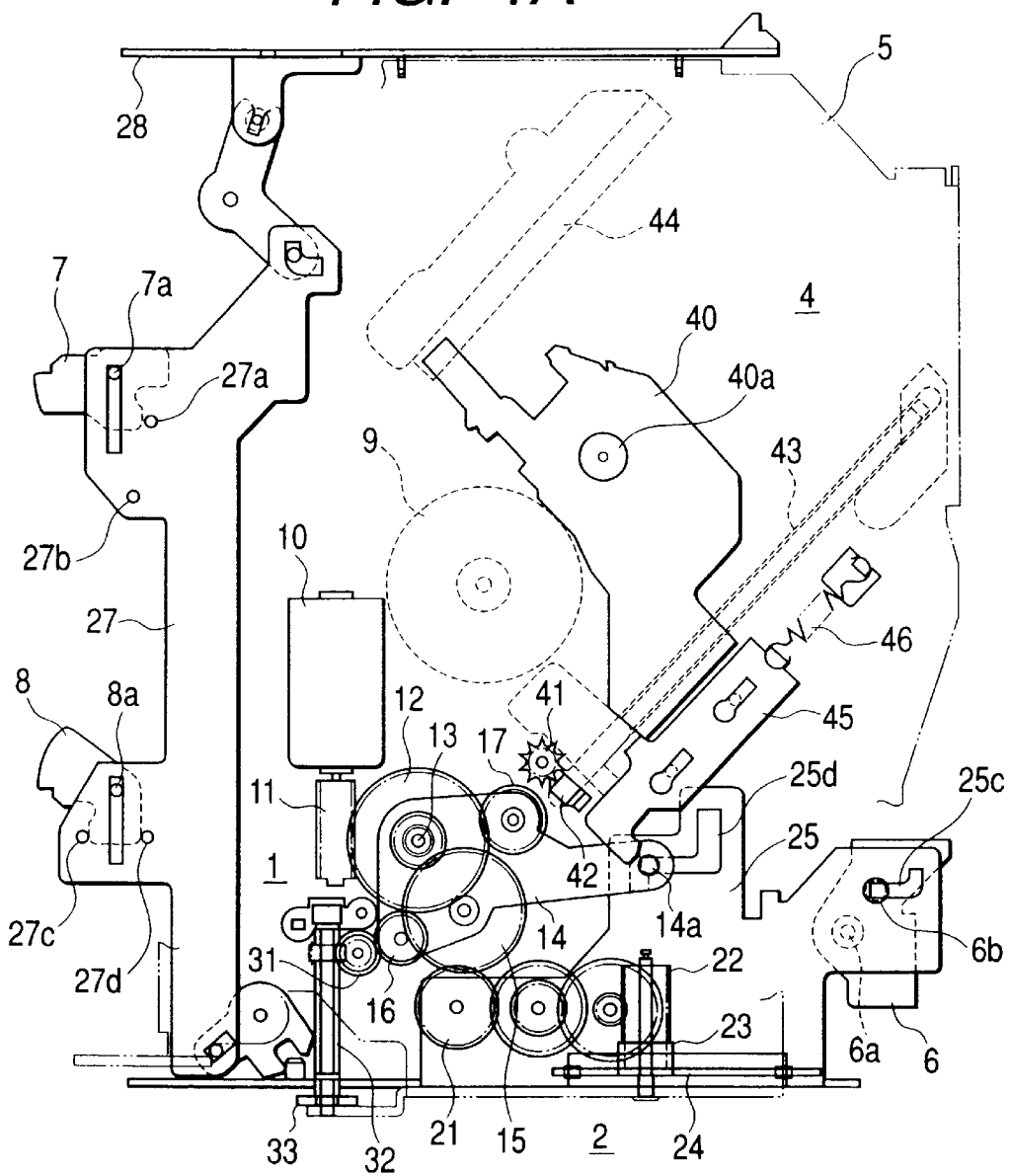
FIGS. 1A and 1B are a plan view and a side view, respectively, each showing an initial state of a disc player according to a first embodiment of the present invention.
Figure 1B:
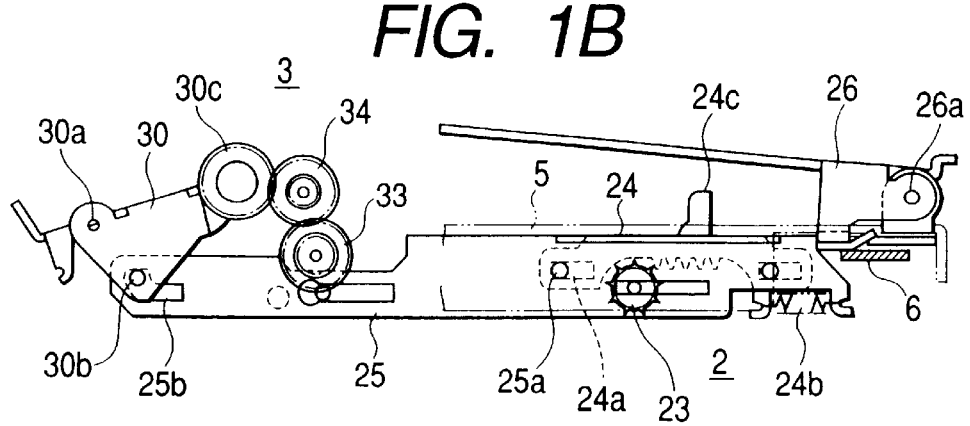

FIGS. 1A and 1B are diagrams each showing an initial state of a disc player according to a first embodiment of the present invention. FIG. 1A is a plan view of the disc player and FIG. 1B is a side view of the same. Major components in the disc player are selectively illustrated in the figures for simplifying their illustrations.

As shown in FIGS. 1A and 1B, in the disc player of the embodiment, a select mechanism 1 is provided for selectively transmitting a drive force of a loading motor (drive source) 10 to any of three mechanisms, a select control mechanism 2, a transport-roller drive mechanism 3 and a pickup feeding mechanism 4. The select control mechanism 2 and the transport-roller drive mechanism 3 are components forming a disc introducing mechanism. Those mechanisms are constructed so that each of them receives a drive force from the select mechanism 1. For this reason, those mechanisms will be described as separated components for each of explanation. In the figures, reference numeral 5 designates a base plate for supporting those mechanisms 1 to 4, and the loading motor 10.

Those mechanisms constructed on the base plate 5 are supported in a floating state on a chassis (not shown) when the disc player is in a playback mode. In an initial state of the disc player as shown in FIG. 1A, those mechanisms are fastened to fixed positions of the chassis by three lock plates, i.e., a damper lock plate 6 and floating lock plates 7 and 8, which are provided on the base plate 5. In the figure, the base plate 5 is indicated by a two-dot chain line for distinguishing it from other component parts, and its illustration is omitted for simplification of illustration. Further, reference numeral 9 designates a disc drive motor, directly coupled to a turntable, for driving the disc to turn. The select mechanism 1 and other mechanisms will be described in detail successive order.

[Select Mechanism]

As shown in FIG. 1A, a worm wheel (drive gear) 12, which constantly engages with a worm 11 provided on a shaft of the loading motor 10, is disposed in the vicinity of the loading motor 10. The worm wheel 12 consists of large and small gears, which are coupled together in a unitary form. The large diameter gear of the worm wheel 12 is constantly in mesh with the worm 11. An idler plate (select member) 14, which is rotatable with respect to a shaft 13 of the worm wheel 12, is provided at a position where the worm wheel 12 is also located. In the embodiment, the disc player is designed such that slight friction interacts between the idler plate 14 and the worm wheel 12.

The idler plate 14 includes a square portion and an elongated portion extended from the square portion. The square portion of the idler plate extends over and covers a part of the worm wheel 12. The idler plate 14 is mounted on the shaft 13 at one of the corners of the square portion of it. Three idler gears 15 to 17 are mounted at the remaining three corners of the square portion of the idler plate. Those idler gears are provided for transmitting a drive force to the select control mechanism 2, select control mechanism 2 and idler plate 14. Those idler gears 15 to 17 are constantly in mesh with the worm wheel 12, and revolve around the worm wheel 12 in accordance with a rotation of the idler plate 14 to couple with the mechanism corresponding thereto.

The idler plate 14, as shown in FIG. 1A, couples the idler gear 15 with the select control mechanism 2. Further, it is turned between a disc introducing position at which the transport-roller drive idler gear 16 is coupled with the transport-roller drive mechanism 3 and a pickup feed position at which the pickup feeding idler gear 17 is coupled with the pickup feeding mechanism 4. A position restricting pin 14a is attached to the top of the elongated portion of the idler plate 14.

[Select Control Mechanism]

As shown in FIG. 1A, the select control mechanism 2 is provided with a select control gear 21, which may be in mesh with the select-control idler gear 15 of the select mechanism 1 already stated. A rotary driver force of the select control gear 21, of which the direction is horizontal, is converted into a rotary drive force of which the direction is vertical by means of a drive-force converting mechanism 22 formed of a plurality of gears which include gears being oriented perpendicular to each other, and the converted one is transmitted to a pinion gear 23 which is integral with one of the perpendicularly oriented gears. As shown in FIG. 1B, the pinion gear 23 rectilinearly drives a select-control shift plate (select control member) 25 with the aid of a rack plate 24.

The rack plate 24 is disposed overlapping in part with the shift plate 25. Those plates are slightly slidable relative to each other by a guide structure formed with the combination of a pair of guide grooves 24a and a pair of pins 25a. The rack plate 24 is urged in a direction in which it will overlap with the shift plate 25, by means of a spring 24b. In the figure, reference numeral 24c designates a trigger engaging part of the rack plate 24. At an initial position, the rack plate 24 is out of engagement with the pinion gear 23 as shown in FIG. 1B. When the trigger engaging part 24c is triggered at the completion of the horizontal transportation of the disc, it moves to the left in the drawing and comes in engagement with the pinion gear 23.

[Control Mechanism of the Sheet Plate]

A first cam hole 25b for selectively controlling a transport roller member 30 (FIG. 1B) and a second cam hole 25c for selectively controlling a damper member 26 with the aid of the damper lock plate 6 (FIG. 1A) are formed in the shift plate 25. Further, a lock hole (disc introducing lock means) 25d for defining the position of the idler plate 14 is formed in the shift plate 25.

The damper member 26 functions to chuck the disc on the turntable. The damper member 26, as shown in FIG. 1B, is turnable about a shaft 26a to move in the vertical direction, and is urged downward or toward the chucking side by means of a spring (not shown). The damper lock plate 6 fixes the base plate 5 to a fixed position with respect to the chassis, and locks the damper member 26 at a chucking removal position located above. The damper lock plate 6, as shown in FIG. 1A, is turnable about a shaft 6a. It is urged to its releasing side by means of a spring (not shown. A pin 6b for defining a position of the damper member 26 is mounted on the damper lock plate.

The transport roller member 30 causes a roller for loading and ejecting the disc to rotate. It is turnable about a shaft 30a. It is urged upward or to the disc contact side by means of a spring, not shown. A position restricting pin 30b is mounted on the transport roller member 30.

Control mechanisms for controlling the transport roller member 30, damper member 26 and idler plate 14 by the shift plate 25 will separately be described hereunder.

Figures 4A, 4B:
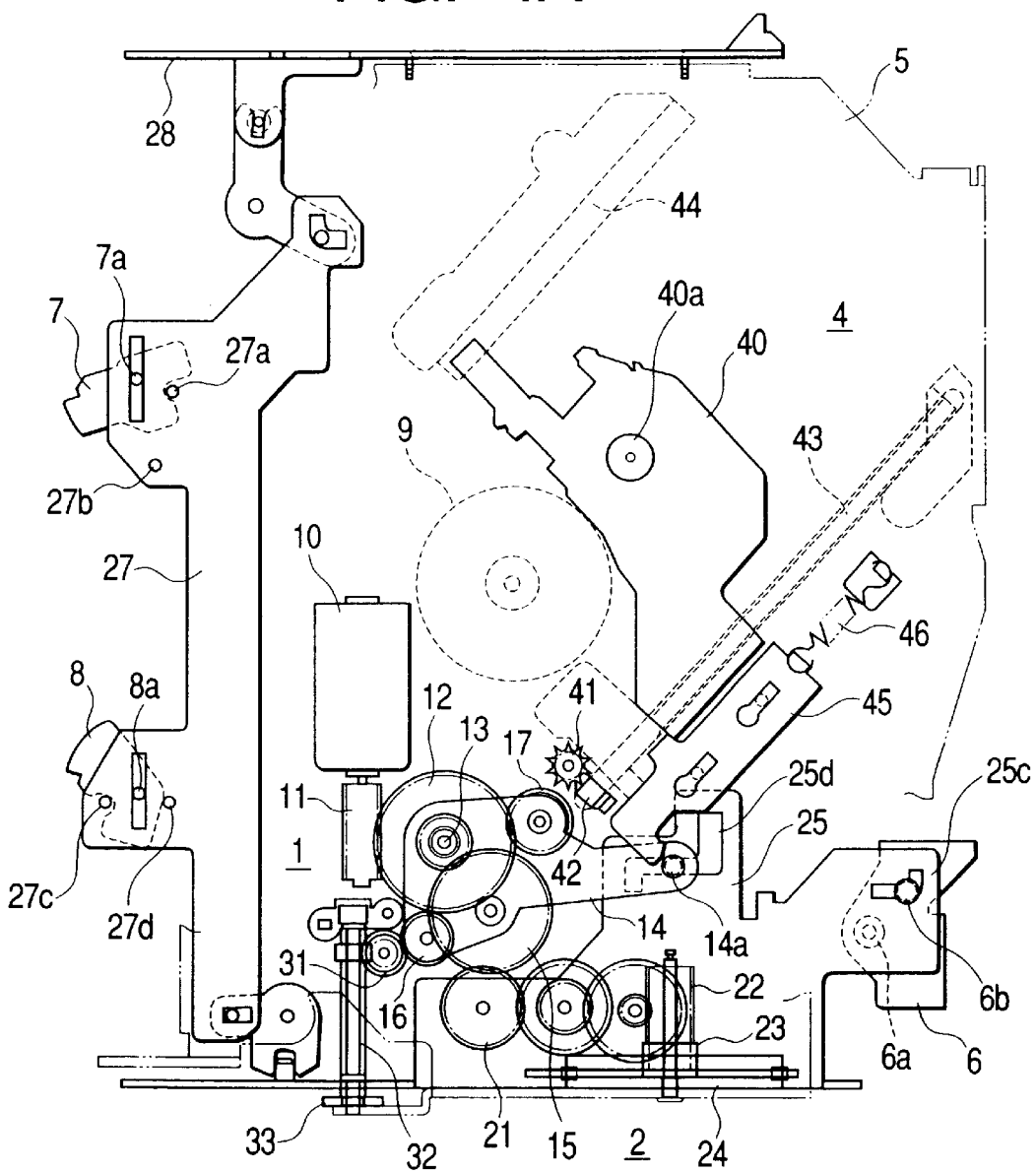
FIGS. 4A and 4B are a plan view and a side view, respectively, each showing a state of the disc player that the shift plate advances from the state of FIGS. 3A and 3B and a floating lock removal operation starts.

The pin 30b of the transport roller member 30 is inserted into the first cam hole 25b of the shift plate 25. In the initial position as shown in FIG. 1B, the shift plate 25 holds the transport roller member 30 at disc engagement position located above. With the advancing operation (to the left in the drawing) of the shift plate from this state, the shift plate turns the transport roller member 30 toward the releasing side. In the midway of the operation as shown in FIG. 4B, the shift plate 2 moves the transport roller member 30 to the final releasing position, and holds it there.

The shift plate 25 is coupled with a sub-sheet plate 28, which is provided on the opposite side of the base plate 5, through a link mechanism 27 including a plurality of links, and moves in the same direction as the moving direction of the sub-sheet plate and in synchronism with the sub-sheet plate 28. The sub-sheet plate 28 also includes a cam hole 8 not shown) like the first cam hole 25b of the shift plate 25. The cam hole receives a pin, like the pin which is provided at the other end of the transport roller member 30. The transport roller member 30 is supported at both ends by the sub-sheet plate 28 and the shift plate 25. With the advancing operation of it from the initial position, the transport roller member 30 is turned to the releasing side, and is finally held at the releasing position.

Figure 5A:
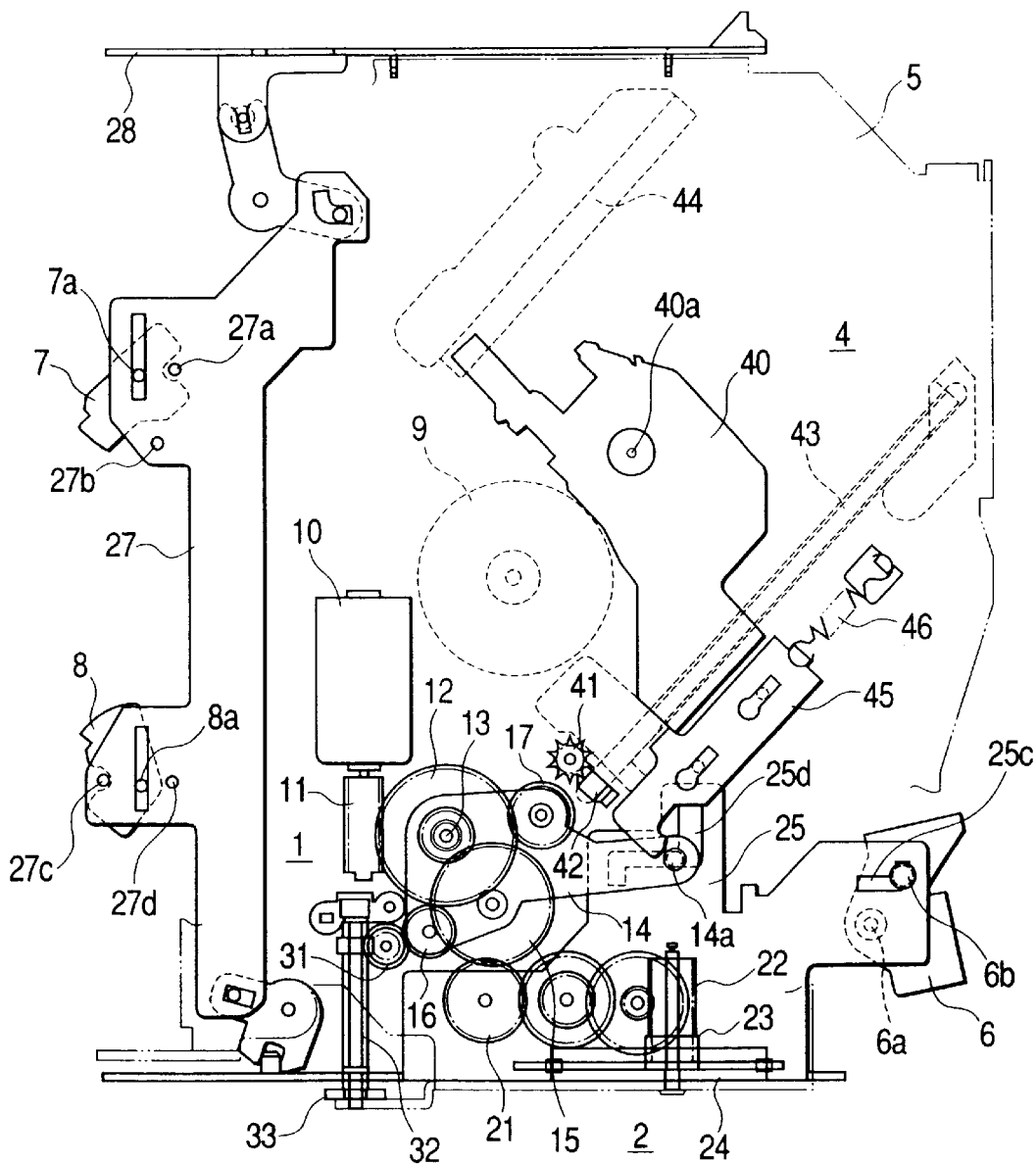
FIGS. 5A and 5B are a plan view and a side view, respectively, each showing a state of the disc player that the shift plate advances from the state of FIGS. 4A and 4B and a chucking operation starts.
Figure 6A:
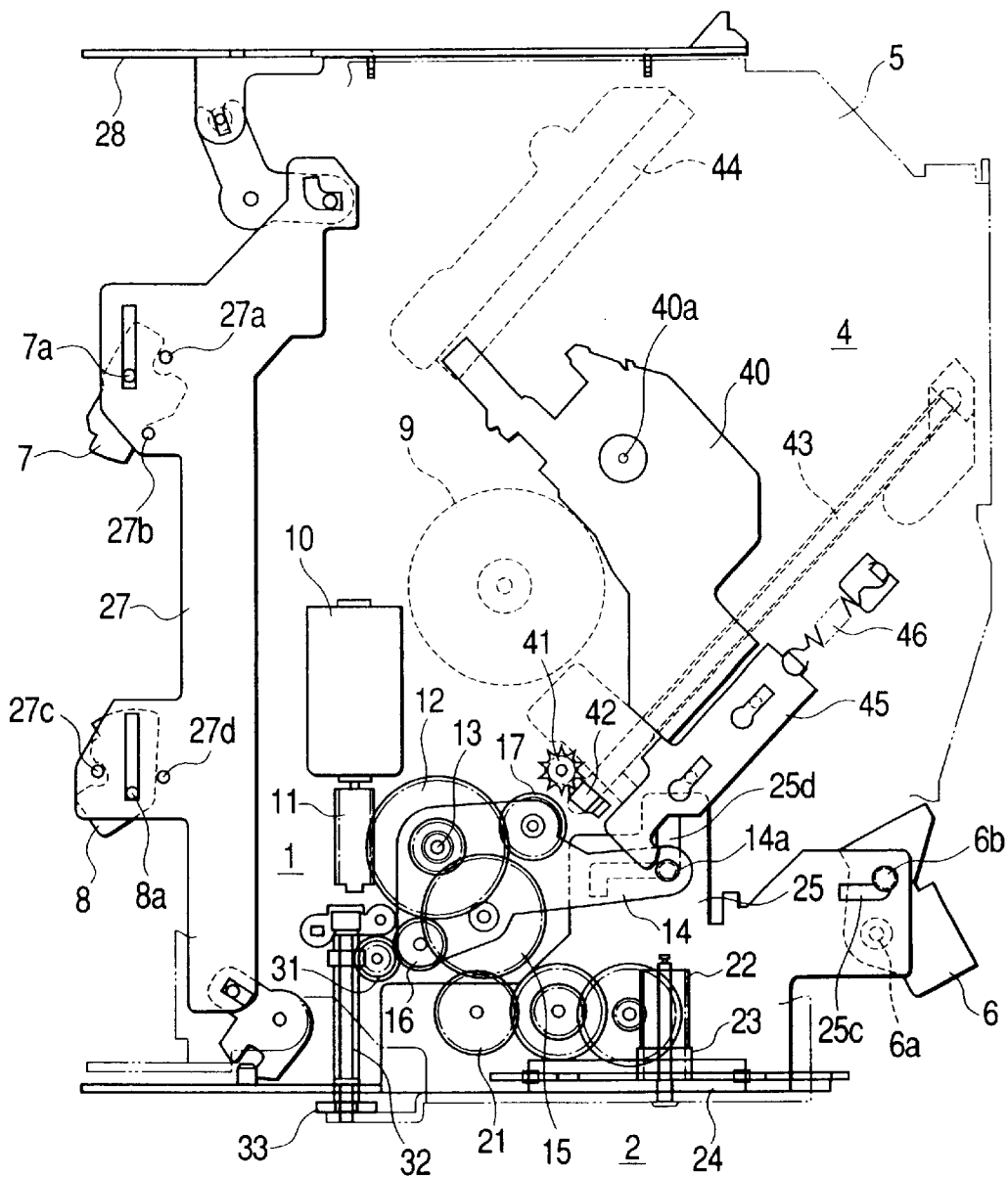
FIGS. 6A and 6B are a plan view and a side view, respectively, each showing a state of the disc player that the shift plate advances from the state of FIGS. 5A and 5B and reaches the foremost position and a chucking operation ends.
Figure 6B:
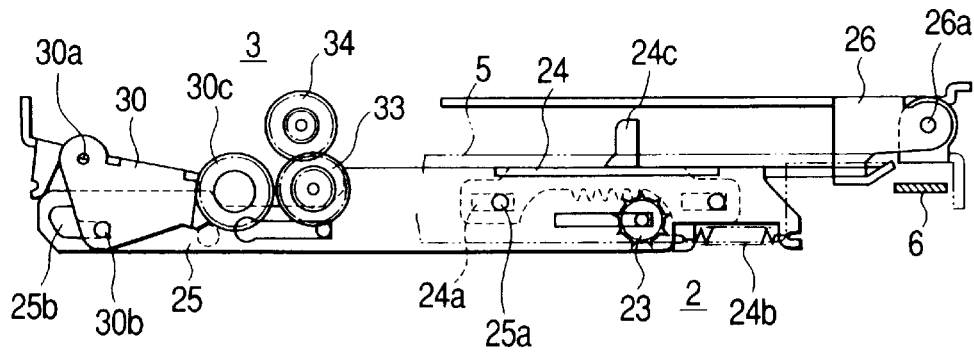

The pin 6b of the damper lock plate 6 is inserted into the second cam hole 25c of the shift plate 25. In an initial position as shown in FIG. 1A, the shift plate 25 holds the damper lock plate 6 at an initial turn position (floating lock position). And as shown in FIG. 1B, it brings the damper lock plate 6 into contact with the lower surface of the damper member 26, to thereby lock it at the chucking releasing position located above. In the latter stage of the advancing motion of the shift plate 25 as shown in FIG. 5A, the shift plate causes the damper lock plate 6 to turn and removes the floating lock. At the chucking end position as shown in FIG. 6A, the shift plate moves the damper lock plate 6 to a turn position of the chucking side. Then, as shown in FIG. 6B, shift plate releases the damper member 26 from the damper lock plate 6, and moves it to a chucking position located below by use of an urging force of the spring.

The pin 14a of the idler plate 14 is inserted into the lock hole 25d of the shift plate 25. The shift plate 25 locks the idler plate 14 at the disc introducing position during its movement from the initial position (FIG. 1A) to the introducing end position (FIG. 6A), and then releases the idler plate 14 from its locked state.

As described above, in the initial position (FIG. 1A), the shift plate 25 holds the damper lock plate 6 at the floating lock position with the aid of the second cam hole 25c, and holds the floating lock plates 7 and 8 at the floating lock position with the aid of the link mechanism 27. The floating lock plates 7 and 8, which are turnable about shafts 7a and 8a, may be turned between the floating lock position (FIG. 1A) and the releasing position (FIG. 6A). Two pairs of position restricting members 27a to 27d are mounted on the link mechanism 27, and come in contact with the edges of the floating lock plates 7 and 8, thereby each restricting the link mechanism.

In the initial position (FIG. 1A), the shift plate 25 holds the clamper lock plates 6 to 8 in a floating lock state. In the midway of its motion (FIG. 4A), the shift plate causes the floating lock plates 7 and 8 to start their turn by use of the position restricting members 27a and 27c of the link mechanism 27, whereby one side of the base plate 5 is released from its floating locking state. Further, in the latter stage of the advancing motion of the shift plate 25 (FIG. 5A), the shift plate 25 causes the damper lock plate 6 to start its turn, whereby the other side of the base plate 5 is released from its floating locking state.

[Transport-Roller Drive Mechanism]

In the embodiment, a drive system for horizontally inserting a disc into and discharging it from the disc player by rotating the transport roller member 30, which is located at the disc insertion slit side (left side in the figure) of the disc player, is provided as the transport-roller drive mechanism 3, separately from a drive system for the select control mechanism 2.

As shown in FIG. 1A, the transport-roller drive mechanism 3 is provided with a transport-roller drive gear 31, which may be in mesh with the transport-roller drive idler gear 16 of the select mechanism 1 already stated. A rotary driver force of the horizontal direction of the transport-roller drive gear 31 is converted into a rotary drive shaft of the vertical direction by a drive-force converting mechanism 32 formed with a gear and a shaft, both being disposed perpendicularly to each other, and is transmitted to a gear 33 integral with the shaft. As shown in FIG. 1B, a coupling gear 34 is provided above the gear 33, and constantly engages with each other. The coupling gear 34 may engage with a transport gear 30c of the transport roller member 30.

The transport gear 30c is provided coaxial with a transport roller (not shown), and operates together with the latter. As shown in FIG. 1B, when the transport roller member 30 is at a disc contact position as shown in FIG. 1B, it comes in engagement with the coupling gear 34. The transport gear 30c is rotated by a drive force which receives from the loading motor 10 through the coupling gear 34. When rotating, it rotates a transport roller (not shown) which operates together with the transport gear 30c, in the loading side direction (clockwise in the figure) or in the eject side direction (counterclockwise in the figure).

[Pickup Feeding mechanism]

As shown in FIG. 1A, a pickup feeding mechanism 4 is provided with a pickup feed gear 41, which may be in mesh with the pickup feed idler gear 17 of the select mechanism 1. A rotary drive gear of the pickup feed gear 41, which acts in the horizontal direction is converted into a rotary drive force of the perpendicular direction by way of a drive force converting mechanism 42 including helical gears disposed perpendicularly to each other. The converted rotary drive force is transmitted to a lead screw 43.

Figure 8A:
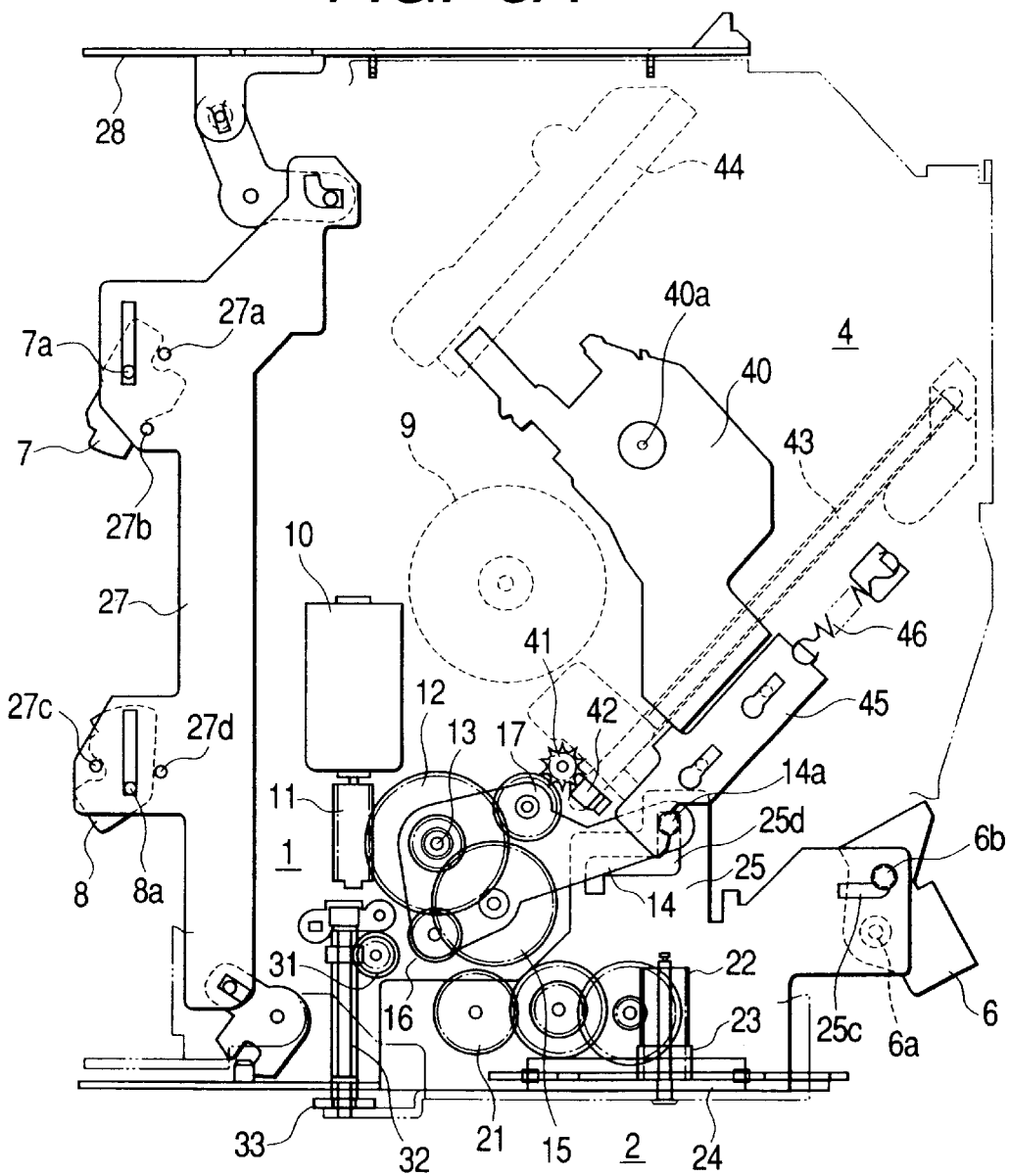
FIGS. 8A and 8B are a plan view and a side view, respectively, each showing a state of the disc player that an optical pickup moves from the state of FIGS. 7A and 7B and reaches a disc inner-rim side position.
Figure 8B:
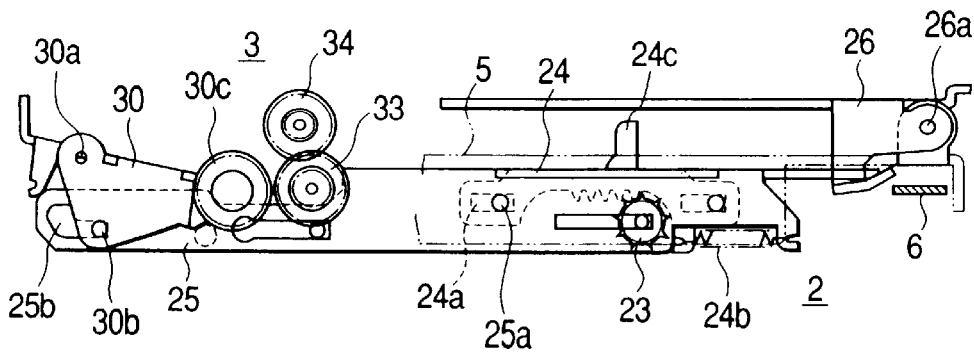
Figure 9A:
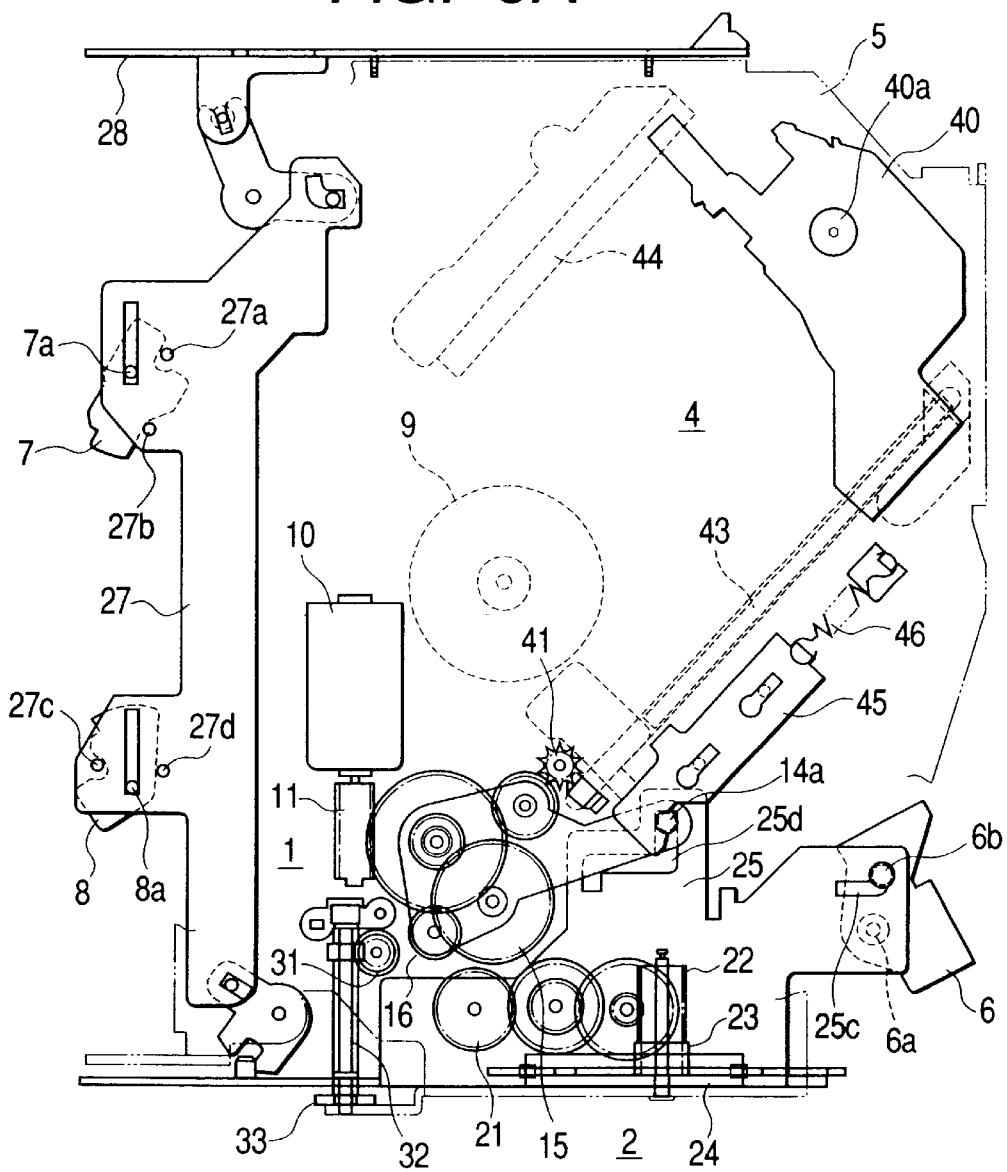
FIGS. 9A and 9B are a plan view and a side view, respectively, each showing a state of the disc player that an optical pickup moves from the state of FIGS. 8A and 8B and reaches a disc mostouter side position.
Figure 9B:
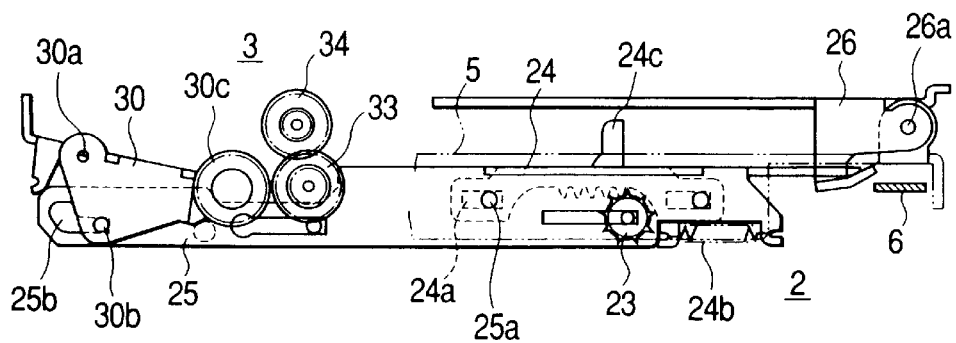

An optical pickup 40 directly engages at one end with the lead screw 43. When the lead screw 43 rotates, the optical pickup 40 is rectilinearly moved in the axial direction of the lead screw 43. The other end of the optical pickup 40 is slidably supported by a slide guide 44. The optical pickup 40 operates within a range from the disc innermost position as shown in FIGS. 1A through 7A to the disc outermost position as shown in FIG. 9A, through the disc inner-rim side position as shown in FIG. 8A.

Here, the term, "disc inner-rim side position", is a position at which the optical pickup 40 first starts its reading operation in a playback mode of the disc player. At this position, the optical pickup may read, through a pickup lens 40a, TOC information as management information stored in the disc inner-rim side area (lead-in area) of a signal recording area of the disc. The term, "disc innermost position" is a position located more innerly than the disc inner-rim side position as viewed in the disc radial direction. At this position, the optical pickup cannot read an optical disc signal.

Further, the pickup feeding mechanism 4 includes an idler lock plate (pickup feed lock means) 45 which comes in engagement with the pin 14a of the idler plate 14 to lock the idler plate 14 at a pickup feed position. The idler lock plate 45 is movable parallel to the optical pickup 40, and it is urged to the locking side by means of a spring 46 and may be brought into engagement with a part of the optical pickup 40.

Figure 7A:
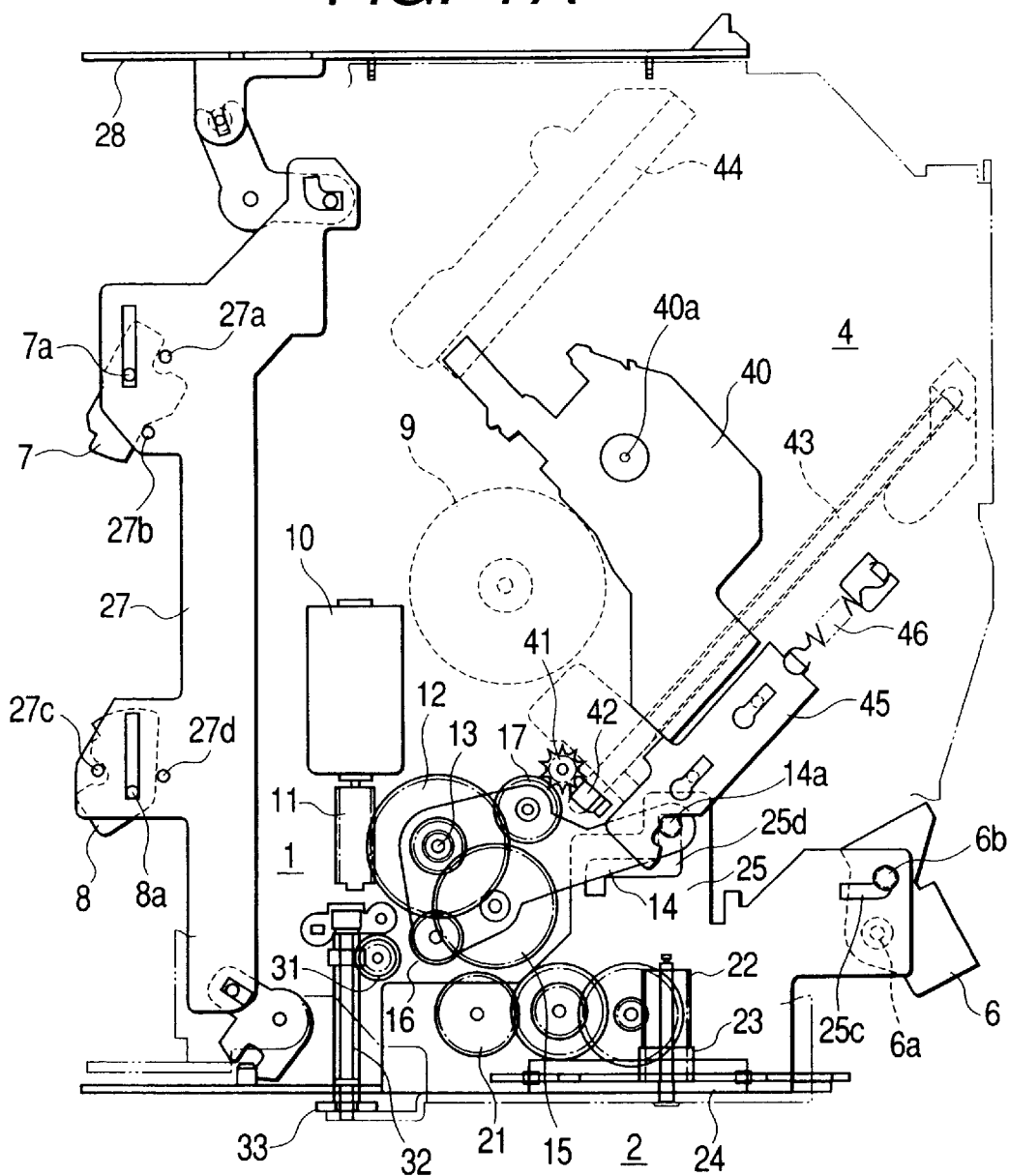
FIGS. 7A and 7B are a plan view and a side view, respectively, each showing a state of the disc player that an idler plate turns from the state of FIGS. 6A and 6B to a pickup feeding position, and a drive selecting operation is performed.
Figure 7B:
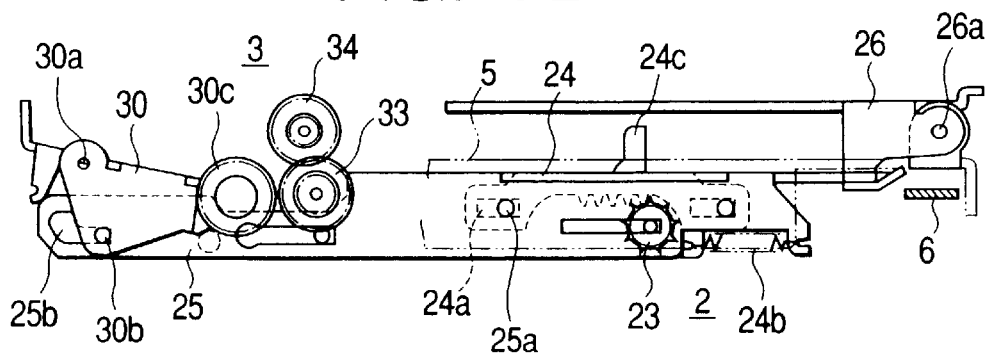

At the disc innermost position as shown in FIG. 7A, the idler lock plate 45 engages the optical pickup 40 and held at the releasing position. And when the optical pickup 40 moves from the disc innermost position to the disc inner-rim side position as shown in FIG. 8A, the idler lock plate 45 is released from the optical pickup 40 and is moved toward the lock side by the urging force of the spring 46. It engages the guide grooves 24a of the idler plate 14 to thereby lock the idler plate 14 at the pickup feed position.

1.1 Operation

The thus constructed disc player of the embodiment is capable of driving both the disc introducing mechanism including the select control mechanism 2 and the transport-roller drive mechanism 3, and the pickup feeding mechanism 4 by the select mechanism 1, which is constructed according to the invention, and by the utilization of a drive force of the loading motor 10. An initial state, and a sequence of disc loading, disc reproducing, and disc ejecting operations will be successively described hereunder.

[Initial State]

As shown in FIG. 1A, in an initial state, the idler lock plate 45 is held at the releasing position by the optical pickup 40 located at the disc innermost position. The pin 14a of the idler plate 14 in the select mechanism 1 is located at the locking part of the lock hole 25d of the shift plate 25. Therefore, the idler plate 14 is locked at the disc introducing position. As a result, the select control idler gear 15 is in mesh with the select control gear 21, and the idler gear 16 is in mesh with the transport-roller drive gear 31.

In this case, the transport roller member 30 of the transport-roller drive mechanism 3 is put at the disc contact position located above by the first cam hole 25b of the shift plate 25. Since the transport gear 30c is in mesh with the coupling gear 34, the transport gear 30c is coupled to the transport-roller drive gear 31. In the select control mechanism 2, the rack plate 24 is not in mesh with the pinion gear 23. Accordingly, the shift plate 25 is separated from the select control gear 21.

The clamper lock plate 6 and the floating lock plates 7 and 8 are also held at the floating lock position since the shift plate 25 is at the initial position. Since the damper lock plate 6 is held at the floating lock position, the damper member 26 is also locked at the chucking removal position.

[Disc Loading and Reproducing Operations]

1) Disc Horizontal Transportation

In the initial state described above, when a disc is inserted into the disc player through a disc insertion slit (left side in the drawing), the loading motor 10 is started up by a loading motor start-up command from a disc detecting element or the like. By the driver force of the loading motor 10, the worm wheel 12 rotates counterclockwise. With a counterclockwise rotation of the idler gear 16 in the select mechanism 1, the transport-roller drive gear 31 of the transport-roller drive mechanism 3 rotates counterclockwise in the figure, and the transport gear 30c being coupled to the transport-roller drive gear 31 rotates clockwise in the figure. As a result, the transport roller (not shown), which rotates together with the transport gear 30c, rotates in the loading side (clockwise in the figure) to horizontally transport the inserted disc onto the turntable. A drive force by the loading motor 10 is transmitted also to the select control gear 21 of the select control mechanism 2, through the select control idler gear 15 in the select mechanism 1. When the disc is horizontally transported, the pinion gear 23 which is constantly in mesh with the select control gear 21, is also rotating.

2) Movement of the Shift Plate and Removal of the Transfer Roller

Figure 2A:
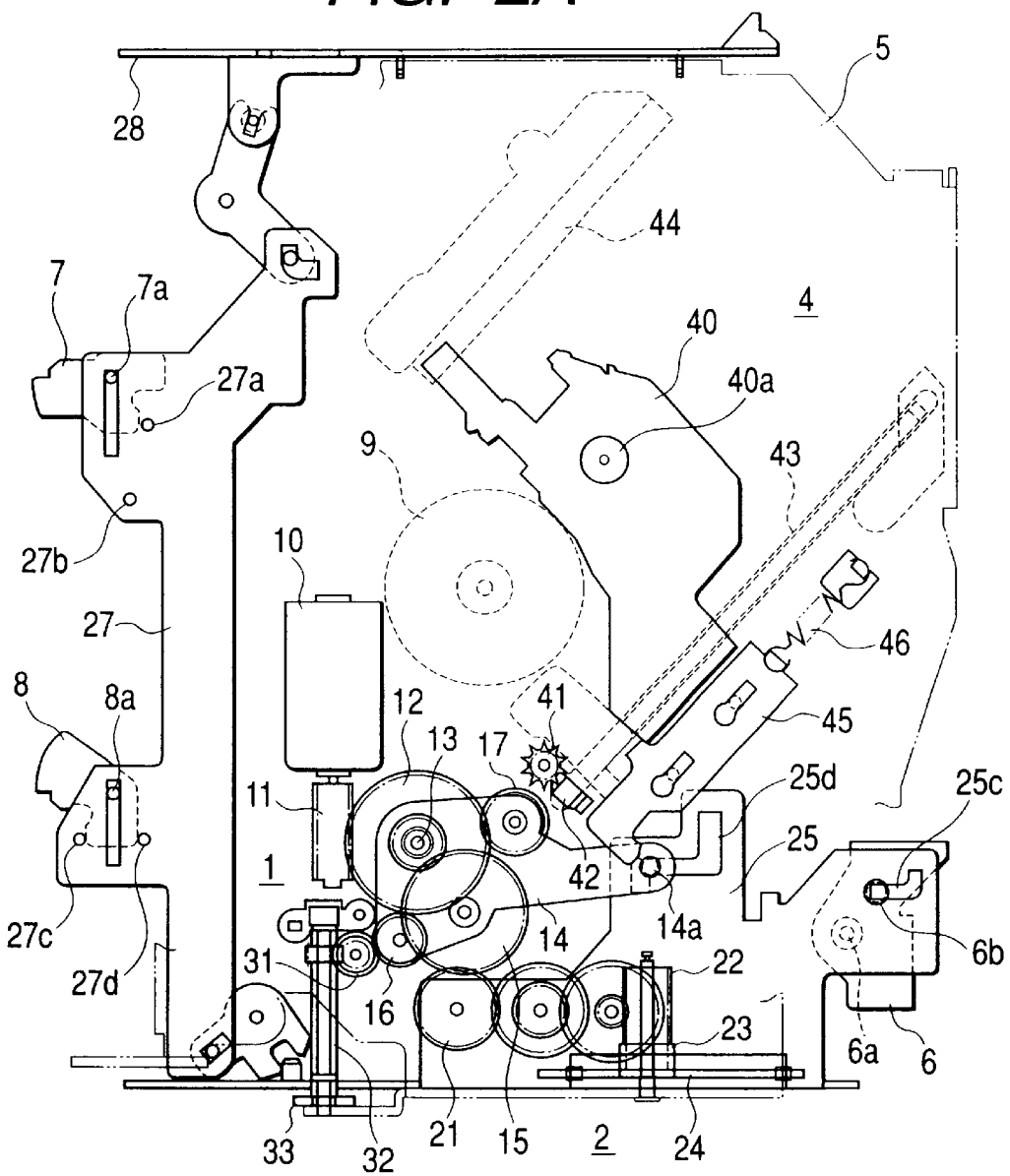
FIGS. 2A and 2B are a plan view and a side view, respectively, each showing a state of the disc player upon starting its operation from the state as shown in FIGS. 2A and 2B, engaging a rack plate with a pinion.
Figure 2B:
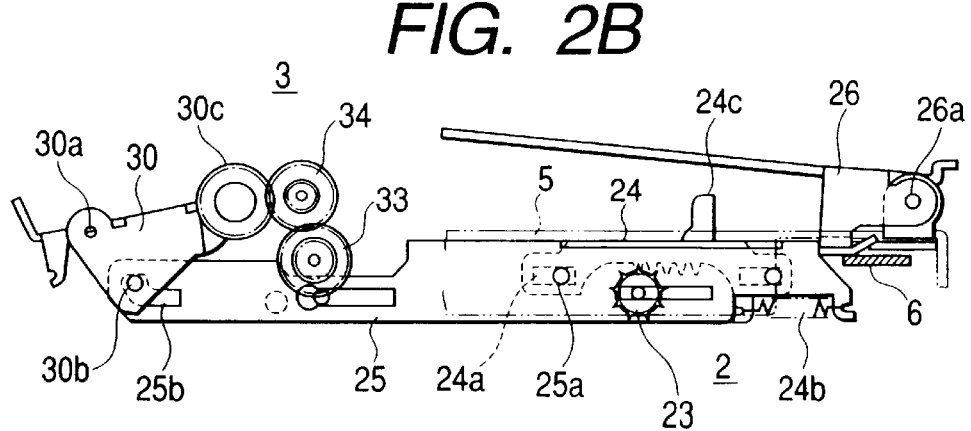

When the transport-roller drive mechanism 3 operates to transport the disc onto the turntable, the rack plate 24 moves to the left side and engages the pinion gear 23 by the triggering of an operation member, which is related to the positioning at the completion of the horizontal transportation of the disc. At this time, the pinion gear 23 has been rotated counterclockwise by the driver force of the loading motor 10. By the rotation of the pinion gear 23, the rack plate 24 advances to the left side in the figure. In this case, the rack plate 24 advances by a fixed stroke, viz., a distance that it moves relative to the shift plate 25, the distance being restricted by the guide grooves 24a and the pins 25a, and comes in engagement with the shift plate 25 (FIGS. 2A and 2B).

Figure 3A:
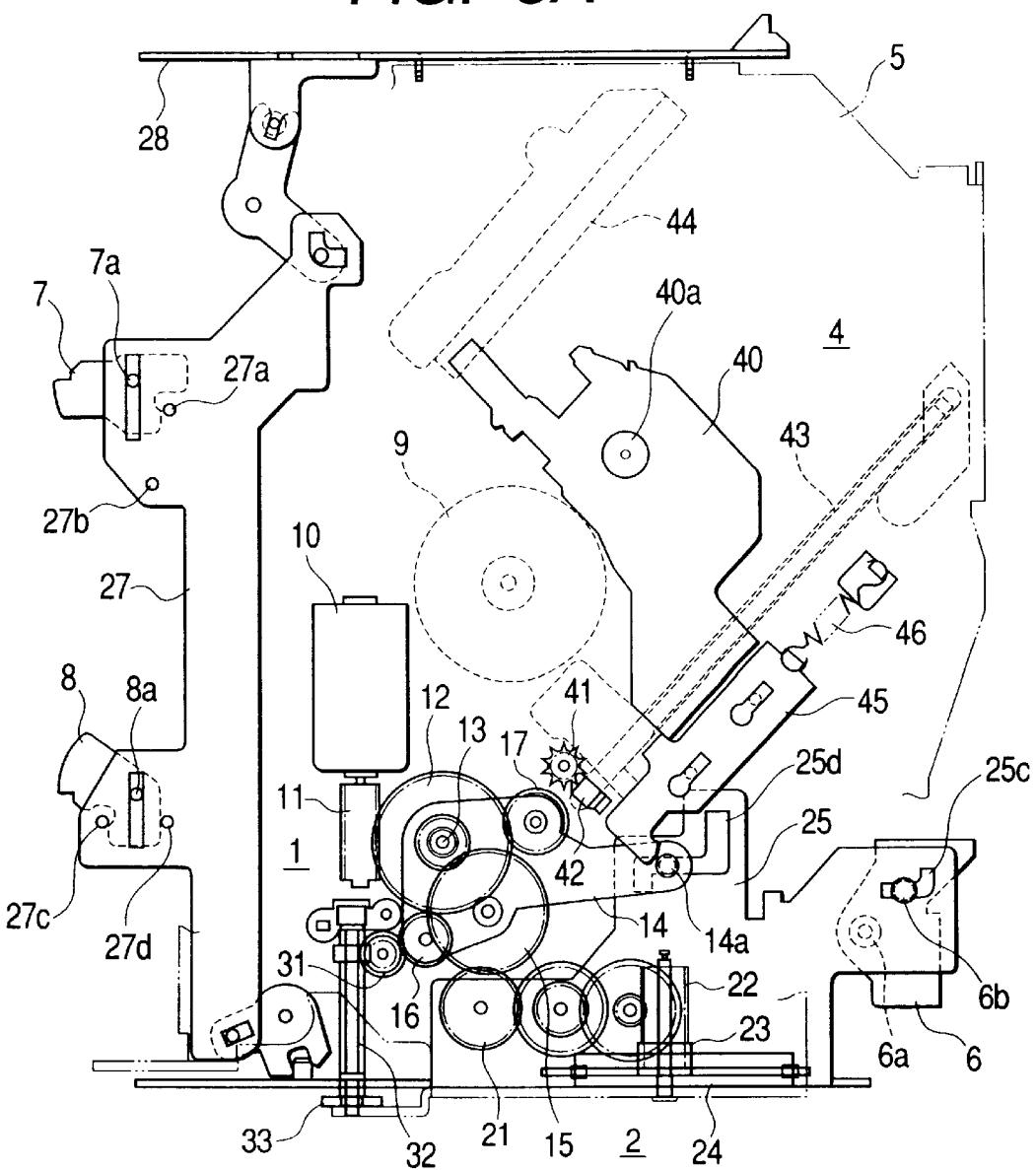
FIGS. 3A and 3B are a plan view and a side view, respectively, each showing a state of the disc player that the shift plate advances from the initial state of FIGS. 1A and 1B and a transport roller releasing operation starts.
Figure 3B:
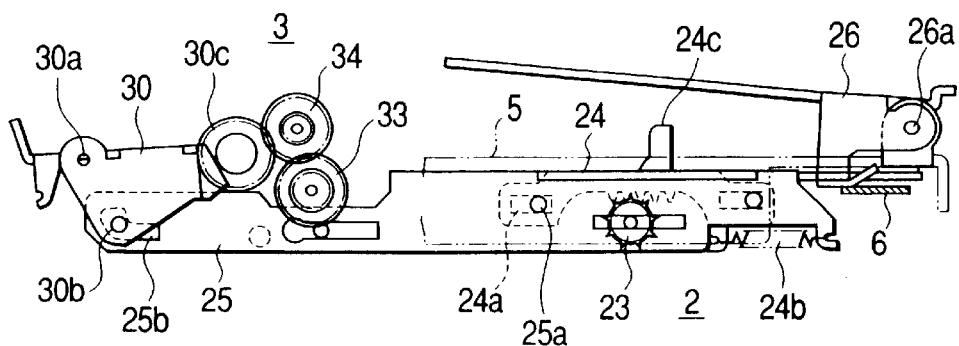

Thereafter, the rack plate 24 and the shift plate 25 advance in unison. Since the position restricting pin 30b of the transport roller member 30 is pressed downward by a cam part of the first cam hole 25b of the shift plate 25, the transport roller member 30 starts to turn downward or to the releasing side (FIGS. 3A and 3B). Incidentally, the idler plate 14 is locked at the disc introducing position since its pin 14a moves to the lock part of the lock hole 25d during the motion of the shift plate 25.

The shift plate 25 advances from a state of FIGS. 3A and 3B. And when it reaches a mid point of the operation stroke, the position restricting pin 30b of the transport roller member 30, as shown in FIG. 4B, reaches a boundary between a cam part and a relief part of the first cam hole 25b of the shift plate 25, and the transport roller member 30 reaches the final releasing position. Thereafter, the position restricting pin 30b of the transport roller member 30 horizontally moves within the relief part of the first cam hole 25b. As a result, the transport roller member 30 is held at the final releasing position. At a time point that the transport roller member 30 reaches the final releasing position, the floating lock plates 7 and 8 have been pressed by the position restricting members 27a and 27c of the link mechanism 27 and have started its turn. Accordingly, the floating lock of one side of the base plate 5 is removed. At this time, the damper lock plate 6 is still held at the floating lock position, and the damper member 26 is locked at the chucking removal position located above.

The shift plate 25 further advances from a state of FIGS. 4A and 4B and the disc player enters a latter phase of the device operation. Then, as shown in FIG. 5A, the second cam hole 25c of the shift plate 25 presses the pin 6b of the damper lock plate 6 and the damper lock plate 6 starts its turn. As a result, the floating lock of the base plate 5 is completely removed. At the same time, with the turn of the damper lock plate 6, the damper lock plate 6 moves along a slanted surface of the bottom of the damper member 26. In turn, the damper member 26 starts to turn downward or to the chucking side by the urging force of the spring.

4) Chucking Completion

Figure 5B:
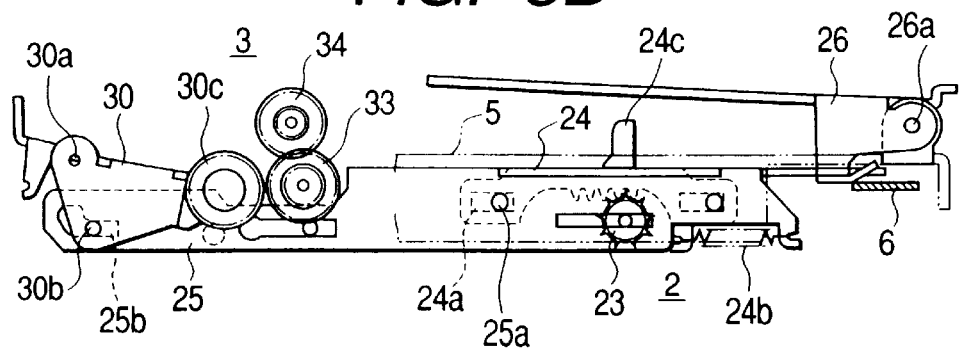

The shift plate 25 further advances from a state of FIGS. 5A and 5B, and reaches the foremost position. And the damper lock plate 6 reaches the final releasing position as shown in FIG. 6A, and the damper member 26 is completely released from its locked state as shown in FIG. 6b. And the damper member 26 reaches to the chucking position located below to chuck the disc onto the turntable. At this time point, the position restricting pin 14a of the idler plate 14 reaches the boundary between the lock part and the relief part of the lock hole 25d of the shift plate 25. In this state, the idler plate 14 may be turned to the pickup feed position.

5) Drive Select

With the turn of the worm wheel 12 in the counterclockwise direction which follows the arrival of the shift plate 25 at the foremost position, a friction interacting between the worm wheel 12 and the idler plate 14 causes the idler plate 14 to turn counterclockwise, and the position restricting pin 14a moves to the relief part of the lock hole 25d of the shift plate 25. With the turn of the idler plate 14, the idler gear 15 is detached from the select control gear 21, while at the same time the clamper lock plate 6 is detached from the transport-roller drive gear 31. When the idler plate 14 reaches the pickup feed position, the idler gear 17 comes in engagement with the pickup feed gear 41 as shown in FIG. 7A.

6) Drive of the Optical Pickup

As the result of the drive select as described above, with the counterclockwise turn of the worm wheel 12 by the drive force of the loading motor 10, the pickup feeding idler gear 17 rotates clockwise direction in the figure, while at the same time the pickup feed gear 41 in the pickup feeding mechanism 4 rotates counterclockwise. With the rotation of the pickup feed gear 41, the lead screw 43 rotates to move the optical pickup 40 from the disc innermost position (FIG. 7A) to the disc outer rim side.

7) Disc Reproduction

The optical pickup 40, which starts its movement from the disc innermost position as described above, reaches a disc inner-rim side position as shown in FIG. 8A. Then, in response to a drive command for the disc drive motor, generated by a disc inner-rim side position detecting element or the like, the disc drive motor 9 is driven and starts its rotation. At this time, the optical pickup 40 reads TOC information, stored in the lead-in area of the disc recording area.

As the result of the movement of the optical pickup 40 to the disc inner-rim side, the idler lock plate 45 is released from the optical pickup 40, and is moved to the locking side by the urging force of the spring 46. And it comes in engagement with the pin 14a of the idler plate 14, and locks the idler plate 14 at the pickup feed position. In a state that the optical pickup 40 is located at this disc inner-rim side position or at a position located more outwardly than the disc inner-rim side position, the idler plate 14 is reliably locked at the pickup feed position by the idler lock plate 45.

Thus, by the rotation of the disc and the movement of the optical pickup 40, a disc reproduction is possible which corresponds to a signal value representative of a range from the disc inner-rim side position shown in FIG. 8A to the disc outermost position shown in FIG. 9A.

Return of optical Pickup and Disc Ejection

In a return operation of the optical pickup and a disc ejecting operation following the former, which both follow the disc reproduction operation, a sequence of operation steps 7' to 1') (FIGS. 9A–B to 1A–B) is performed which is the reverse sequence of the operation steps 1) to 7) in the disc loading and reproduction operations already stated, except that the disc drive motor 9 is not driven.

7') Return Start of Optical Pickup

When the loading motor 10 is reversely turned in response to an ejection command generated by an ejection operation at the end of disc reproduction, the worm wheel 12 is rotated clockwise by the drive force of the loading motor 10, and the pickup feed gear 41 of the pickup feeding mechanism 4 is rotated clockwise.

6') Return End of the Optical Pickup

When the optical pickup 40 starts a high speed movement as described above and reaches the disc inner-rim side position as shown in FIG. 8A, the releasing of the idler plate 14 from its state being locked by the idler lock plate 45 starts. when moving to the disc innermost position as shown in FIG. 7A, the optical pickup 40 engages the idler lock plate 45 to move it to the releasing position, so that the idler plate 14 is released from the idler lock plate 45.

5') Drive Select

By the turn of the worm wheel 12 clockwise in the figure after the optical pickup 40 reaches the disc innermost position, the idler plate 14 is turned clockwise by a friction between the worm wheel 12 and the idler plate 14. And its pin 14a moves to the relief part of the lock hole 25d of the shift plate 25. With the turn of the idler plate 14, the idler gear 17 is separated from the pickup feed gear 41. When the idler plate 14 reaches the disc fetch position, the idler gear 15 comes in engagement with the select control gear 21 as shown in FIG. 6A, and the idler gear 16 comes in engagement with the transport-roller drive gear 31.

4') Chucking Removal

As a result of the drive selecting operation as described above, with the rotation of the worm wheel 12 in the clockwise direction by the drive force of the loading motor 10, the pinion gear 23 rotates, and the rack plate 24 and the shift plate 25 start to retract in unison. With the retracting operation of the shift plate 25, the clamper lock plate 6 starts to rotate in the floating lock side direction as shown in FIG. 5A, and the clamper member 26 starts to turn toward the chucking removal position located above, as shown in FIG. 5B.

At this time point, as shown in FIG. 5A, the pin 14a of the idler plate 14 is positioned within the lock part of the lock hole 25d of the shift plate 25. As the subsequent retracting operation of the shift plate 25 progresses, the idler plate 14 is held at the disc introducing position by the lock hole 25d of the shift plate 25. At this time point, as shown in FIG. 5B, the transport roller member 30 exists at the chucking removal position located below, and the transport gear 30c is separated from the transport-roller drive gear 31. Therefore, the transport roller is not rotated.

3') Floating Lock and Chucking Removal End

When the shift plate 25 further retracts from a state of FIGS. 5A and 5B, and reaches a midpoint in the operation stroke, the damper lock plate 6 reaches the floating lock position as shown in FIG. 4A, and the damper member 26 reaches the chucking removal position located above. At this time point, by the position restricting members 27a and 27c of the link mechanism 27, the floating lock plates 7 and 8 are also turned toward the floating lock side. Also at this time point, as shown in FIG. 4B, the position restricting pin 30b of the transport roller member 30 reaches the boundary between the cam part and the relief part of the first cam hole 25b of the shift plate 25. By the subsequent retraction of the shift plate 25, it may be turned.

When the shift plate 25 further retracts from a state of FIGS. 4A and 4B, and reaches a position near the initial position, the floating lock plates 7 and 8 reach the floating lock position as shown in FIG. 3A. As a result, the mechanism arranged on the base plate 5 is fixed to a fixed position with respect to the chassis. At this time point, as shown in FIG. 3A, the transport roller member 30 is urged to the upward side or the disc contact side by a spring, not shown. Then, it has started to turn upward, and the transport gear 30c comes in engagement with the coupling gear 3. As a result, the transport roller, which operates together with the transport gear 30c, starts to rotate toward the ejection side or (counterclockwise) At this time point, it does not yet contact with the disc. Accordingly, the disc is not transported.

2') Sheet Plate Stop and Transport Roller Contact

As shown in FIG. 2A, at a time point that the shift plate 25 is returned to the initial position, the transport roller member 30 reaches a disc contact position located above as shown in FIG. 2B and is placed to a state that it is capable of transporting the disc. Also after the shift plate 25 returns to the initial position, the rack plate 24 being in mesh with the pinion gear 23 retracts a fixed stroke with respect to the shift plate 25, and returns to the initial position where it is separated from the pinion gear 23 as shown in FIG. 1A.

1') Disc Horizontal Transport

As shown in FIG. 2B, after the transport roller member 30 reaches the disc contact position located above, the disc is horizontally transported from the turntable to the disc insertion slit side by the rotation of the transport roller in the ejection side direction (counterclockwise in the figure), and reaches a place which may be accessed from the outside. At this time point, the loading motor 10 is stopped by a stop command to stop the loading motor, produced by the disc detecting element or the like.

1.3 Effects

As described above, in the disc player of the embodiment, the disc introducing mechanism including the select control mechanism 2 and the transport-roller drive mechanism 3, and the pickup feeding mechanism 4 can both be driven by the select mechanism 1, which is constructed according to the invention, while utilizing a drive force of the loading motor 10. Therefore, the number of required motors may be reduced by one with certainty, when comparing with the conventional technique in which different motors are used for driving the disc introducing mechanism and the pickup feeding mechanism. Specifically, the whole mechanism may be driven by merely using two motors, a disc drive motor 9 and a loading motor 10.

The idler gears 15 to 17 are used for the select control mechanism 2, transport-roller drive mechanism 3 and pickup feeding mechanism 4, respectively. Therefore, idler gears 15 to 17 may be disposed at appropriate positions in those mechanisms. Accordingly, design freedom is secured when comparing with the construction where a single idler gear is coupled to those mechanisms. In this connection, the select mechanism 1 has a simple construction composed of the worm 11, worm wheel 12, idler plate 14 and three idler gears 15 to 17.

Thus, the embodiment succeeds in reducing the number of component parts including support members of the motor and drive force transmission members, simplifying the construction, and reducing the occupied space. Further, the layout and design freedom of the members in the mechanisms including the select mechanism around the motor are improved, and the number of wires used for the power supply to and control of the motor is reduced. This accrues to reduction and simplification of the overall mechanism. Manufacturing cost is reduced by the cost of one motor. In this respect, the disc player is economical.

In the floating/ejecting operation, the idler plate 14 is locked at the disc introducing position by the shift plate 25, whereby the coupling of the select control mechanism 2 and the transport-roller drive mechanism 3 with the loading motor 10 is reliably maintained. In the disc reproduction operation, and the returning operation of the optical pickup, the idler plate 14 is located at the pickup feed position by the idler lock plate 45, whereby the coupling of the pickup feeding mechanism 4 with the loading motor 10 is reliably maintained.

Accordingly, the disc player prevents the idler plate 14 from erroneously operating during the operation of the disc player. In this respect, an operation reliability of the disc player is excellent. In this case, the shift plate 25 as select control member is used for the disc introducing lock means. Therefore, the number of component parts required is reduced when comparing with the case where the dedicated locking member is used.

Further, when the shift plate 25 reaches the chucking end position, removal of the locking of the idler plate 14 is reliably removed. The select control mechanism 2 and the transport-roller drive mechanism 3 are reliably switched to the pickup feeding mechanism 4. When the optical pickup 40 returns to the initial state, the idler lock plate 45 is mechanically and reliably moved to the releasing side by the optical pickup 40, whereby the idler plate 14 is released from its locking state. The pickup feeding mechanism 4 is reliably switched to the select control mechanism 2 and the transport-roller drive mechanism 3.

Accordingly, the shifting operation from the disc loading operation to the optical pickup feed operation is reliable. The shifting operation from the returning operation of the optical pickup to the disc ejecting operation is reliable. Also in this respect, the operation reliability of the disc player is excellent.

2nd EMBODIMENT

2.1 Construction

Figure 10:
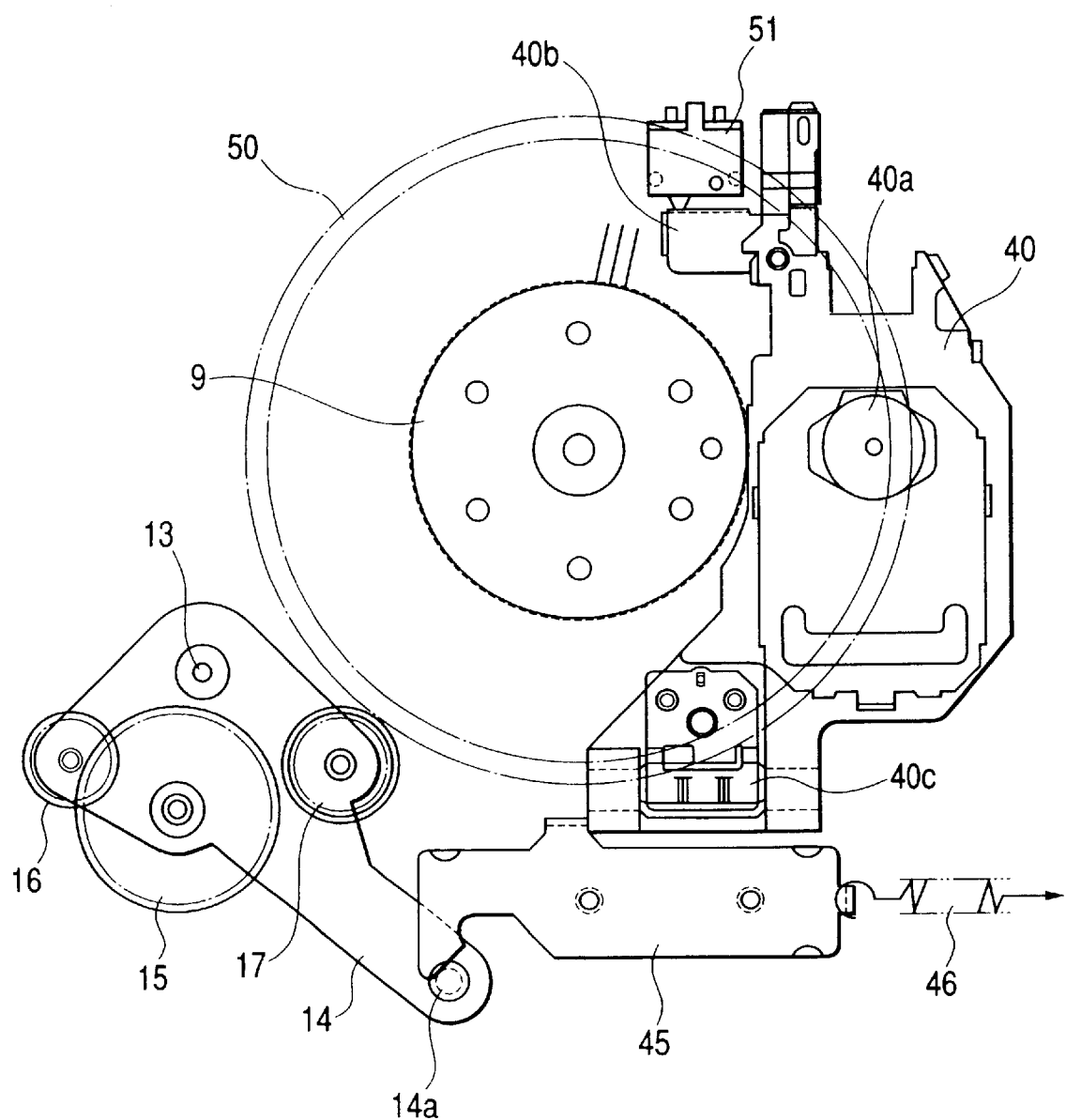
FIG. 10 is a view showing an initial state of a status detecting mechanism utilizing an operation of the optical pickup in a disc player according to a second embodiment of the present invention.

FIG. 10 is a diagram showing a disc player which is a second embodiment of the present invention. More precisely, the figure is a plan view showing an initial state of a status detecting mechanism which utilizes an operation of the optical pickup. An arrangement of the disc player of the second embodiment, inclusive of the status detecting mechanism, is basically the same as of the disc player of the first embodiment. Hence, description of the second embodiment will be given while laying emphasis on the difference of the second embodiment from the first embodiment.

In FIG. 10, a lead-in area 50 of a disc located on a turntable is illustrated. A detector switch (detecting element) 51 is provided which detects both the inner periphery and the chucking end detection of the optical pickup 40 in accordance with an operation of the optical pickup 40 relative to the lead-in area 50. A pressing member 40b for pressing the detector switch 51 is provided at one end of the optical pickup 40.

Figure 11:
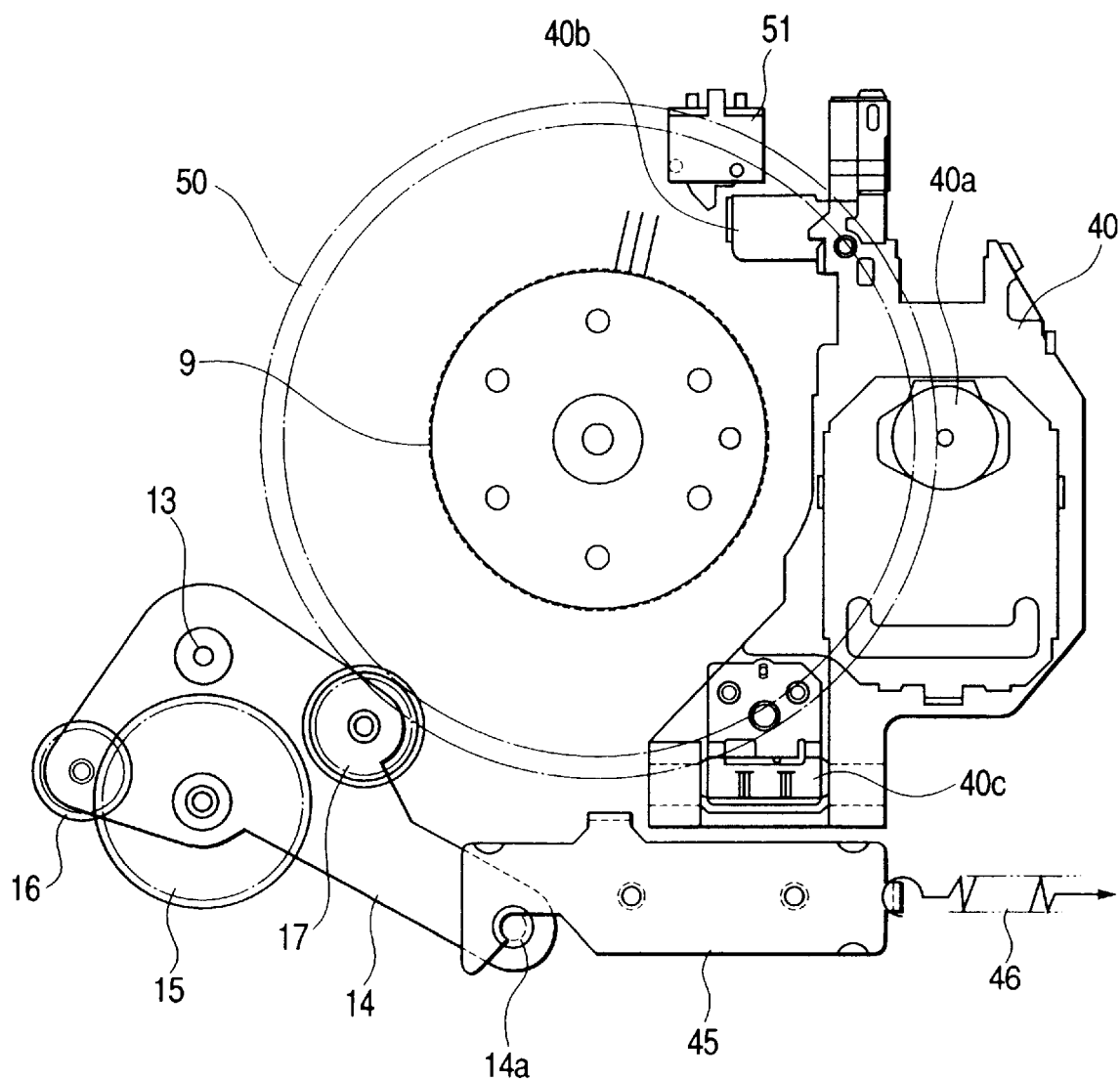
FIG. 11 is a plan view showing a state of the disc player of FIG. 10 that the optical pickup reaches a disc inner-rim side position.

The detector switch 51 and the pressing member 40b are arranged such that the detector switch 51 is pressed by the pressing member 40b when the optical pickup 40 is within a range from the disc innermost position as shown in FIG. 10 to the disc inner-rim side position as shown in FIG. 11, and the detector switch 51 is released from the pressing state by the pressing member 40b when the optical pickup 40 moves outward beyond the disc inner-rim side position as shown in FIG. 11. The detector switch 51 and the pressing member 40b are located on the opposite side of a screw holder 40c which holds the lead screw (designated by reference numeral 43 in FIGS. 1 to 9).

2.2 Operation

In the thus constructed disc player of the second embodiment, the chucking end and the disc innermost position of the optical pickup can be detected by use of the single detector switch 51. The detecting operations by the detector switch will be described hereunder.

As shown in FIG. 10, in the initial state, the optical pickup 40 is located such that the center of the pickup lens 40a is positioned at the disc innermost position, which is more innerly than the lead-in area 50 of the disc, and that the pressing member 40b presses the detector switch 51. At this time point, the idler plate 14 is locked at the disc introducing position by the lock hole 25d of the shift plate 25 as shown in FIGS. 1 to 9. On the other hand, the idler lock plate 45 engages the optical pickup 40, and is held at the releasing position, and hence does not lock the idler plate 14.

In this initial state, a disc is inserted into the disc player, and a disc loading operation is carried out the idler gear 15 and the idler gear 16, which are on the idler plate 14 located at the disc introducing position. The optical pickup 40 is held at the disc innermost position till the disc is chucked on the turntable.

Thereafter, the operation of chucking the disc on the turntable ends, and the idler plate 14 is turned counterclockwise and reaches the pickup feed position as shown in FIG. 11. Then, the optical pickup 40 starts to move outward (to the right in the figure). At a time point that the optical pickup 40 is moved such that the center of its pickup lens 40a reaches the disc inner-rim side position overlapping the position of the lead-in area 50 of the disc, the idler lock plate 45 is released from the optical pickup 40, engages the pin 14a of the idler plate 14 by the urging force of the spring 46, and locks the idler plate 14 at the pickup feed position.

Figure 12:
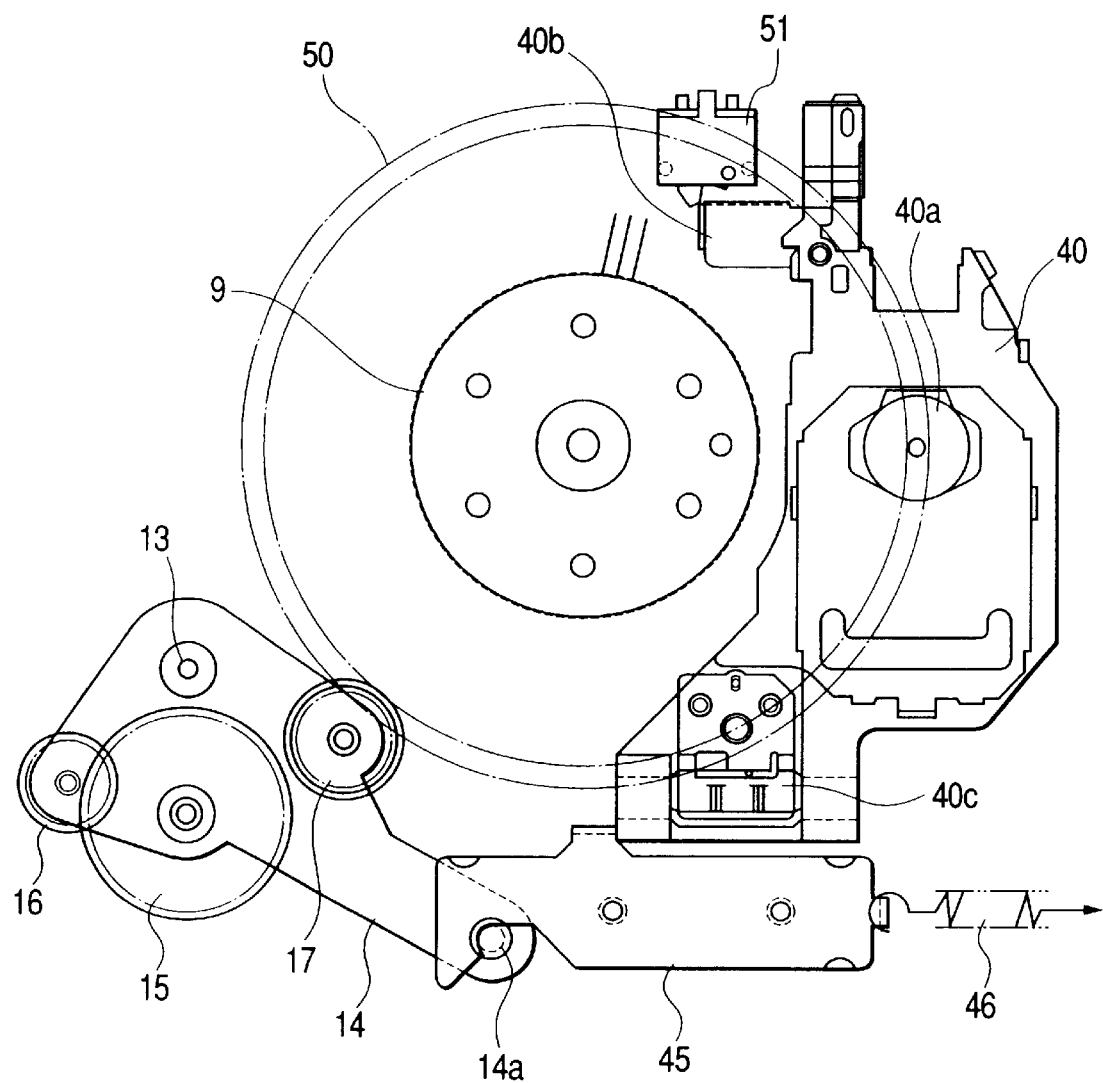
FIG. 12 is a plan view showing a state of the disc player of FIG. 10 that the optical pickup reaches a position outside the disc inner-rim side position as viewed radially.

At such the disc inner-rim side position, as shown in FIG. 11, the optical pickup 40 presses the detector switch 51 by the pressing member 40b. At a time point that it has been moved outward, it separates from the detector switch 51. Specifically, as shown in FIG. 12, at a time point that the center of the pickup lens 40a is moved to outside the lead-in area 50 of the disc, the pressing member 40b separates from the detector switch 51 to release the detector switch 51. A chucking end detection is carried out by a signal generated from the detector switch 51 by this operation.

In response to such a chucking end detection, the operating direction of the optical pickup 40 is reversed, it is moved to the disc inner-rim side position as shown in FIG. 11, from a position located more outward than the disc inner-rim side position as shown in FIG. 12. As a result, the detector switch 51 once released is pressed by the pressing member 40b of the optical pickup 40. A signal, which is generated from the detector switch 51 by the operation, the disc inner-rim side detection is carried out.

Further, the disc drive motor 9 is driven to turn the disc in accordance with the disc inner-rim side position of the pickup, a TOC signal recorded in the detector switch 51 is read by the optical pickup 40. At this time, the idler plate 14 is locked at the pickup feed position by the idler lock plate 45. A drive-force transmission system of the optical pickup 40 is maintained. After the TOC signal is read, the disc reproduction is carried out through the combination of the rotation of the disc and the movement of the optical pickup 40.

In the ejection mode, when the optical pickup 40 moves inward for its return and reaches the disc inner-rim side position, the detector switch 51 having been in a releasing state is pressed by the pressing member 40b, whereby the disc inner-rim side position of the optical pickup is carried out. And the optical pickup 40 stops when it moves from this position to the disc inner-rim side by a predetermined distance, and when it reaches at the disc innermost position as shown in FIG. 10.

2.3 Effects

Thus, in the disc player of the embodiment, the single detector switch 51 can detect both the chucking end and the disc inner-rim side position of the optical pickup by utilizing the operation of the optical pickup 40. Therefore, the number of required detecting elements is reduced when comparing with the conventional disc player which uses the detecting elements for the detection purposes, respectively. Accordingly, the number of wires for the detecting elements is also reduced, and the layout and design of the related members are easy. This leads to simplification of the overall mechanism construction. In the embodiment, the detector switch 51 is located at the place on the opposite side of the lead screw, which is relatively free in use in the space around the optical pickup 40. Therefore, freedom of laying out the detector switch 51 is increased, and it little influences the layout and design of other members.

THIRD EMBODIMENT

3.1 Construction

Figure 13:
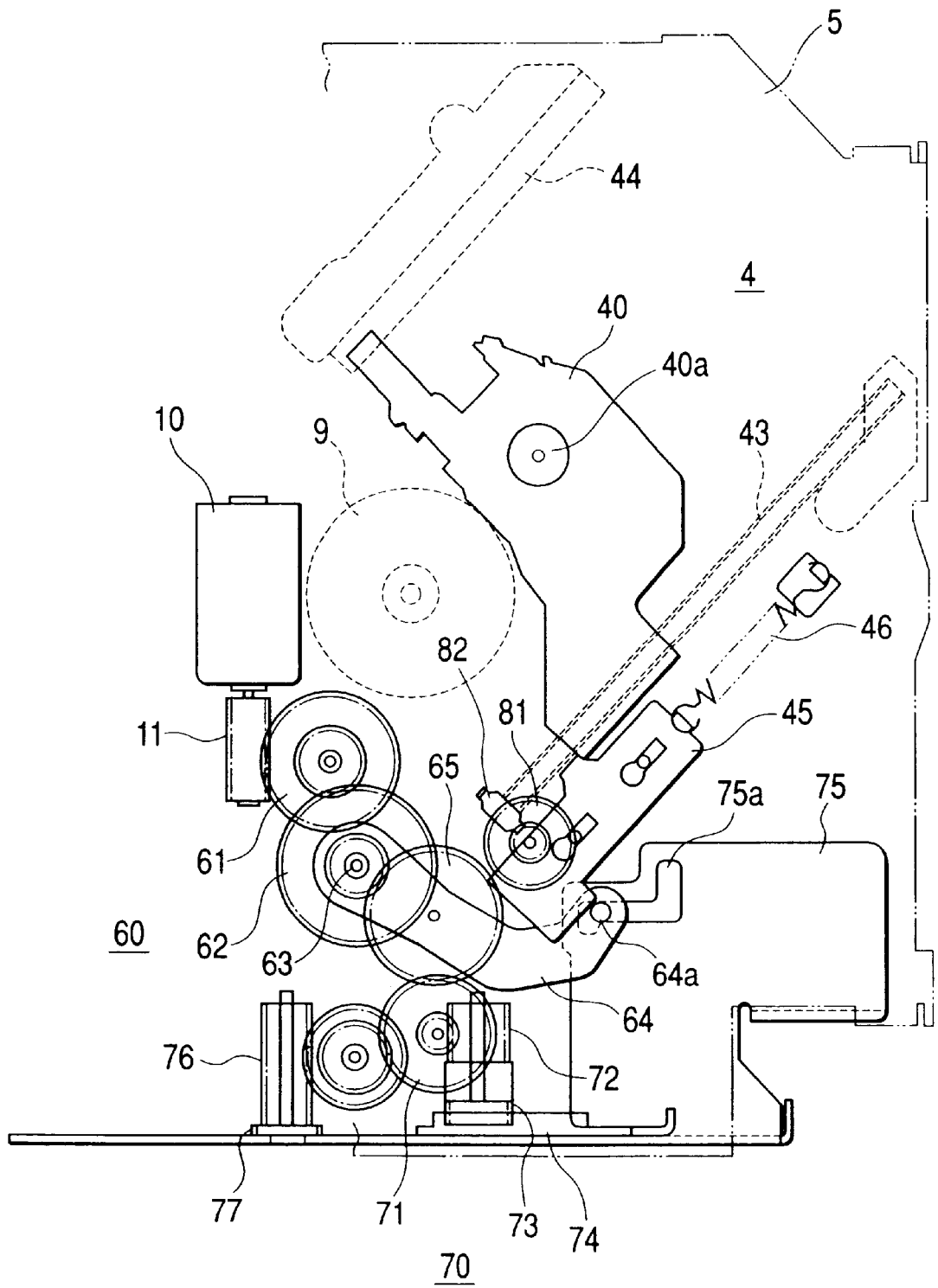
FIG. 13 is a view showing a disc player according to a third embodiment of the present invention.

FIG. 13 is a diagram showing a disc player which is a third embodiment of the present invention. This embodiment presents a modification of the drive-force transmission system in the first embodiment. In the figure, only major members in the drive system are illustrated for simplicity of illustration.

In the disc player of the embodiment, as shown in FIG. 13, a drive force of the loading motor 10 is selectively transmitted to two mechanisms, a disc introducing mechanism 70 and a pickup feeding mechanism 4. As recalled, in the first embodiment, the drive-force transmission systems are provided for the select control mechanism 2 and the transport-roller drive mechanism 3, respectively. On the other hand, in the third embodiment, a single drive-force transmission mechanism, or a disc introducing mechanism 70 is used in place of the separate drive-force transmission systems, and the select mechanism 60 is modified. The select mechanism 60 and the disc introducing mechanism 70 will be described in detail hereunder.

In the select mechanism 60, an idler plate 64 is provided at a place overlapping a place of a drive gear 62 being constantly in mesh with a worm wheel 61, in a state that the idler plate 64 may be turned about a shaft 63 of the drive gear 62, while in the previous embodiment, it is provided on the worm 11 provided on the shaft of the loading motor 10. The idler plate 64 is shaped like an inverse J. The end of the straight part of the inverse-J shaped idler plate 64 is mounted on the shaft 63. A single idler gear 65 is mounted on the middle of the straight part. The idler plate 64 is turned between a disc introducing position where the idler gear 65 is coupled to the disc introducing mechanism 70 and a pickup feed position where the idler gear 65 is coupled to the pickup feeding mechanism 4. A position restricting pin 64a is attached to the end of the curved part of the inverse-J shaped idler plate 64.

The disc introducing mechanism 70 includes a disc introducing gear 71 which may engage with the idler gear 65 in the select mechanism 60. A rotational drive force of the disc introducing gear 71 is transmitted to a rack plate 74 and a shift plate 75, through a first driver-force converting mechanism 72 and a pinion 73, to thereby rectilinearly drive those plates 74 and 75.

In the figure, the idler plate 64 is inserted into a lock hole 75a formed in the shift plate 75, but its engagement relation to other members is not illustrated. Actually, a cam and other members are provided as in the first embodiment. The transport roller member or the damper member is selected in accordance with a position of the shift plate 75. The drive force of the disc introducing gear 71 is transmitted to a gear 77, through a second drive-force converting mechanism 76. This gear 77 provides a rotational drive force to rotate the transport roller (not shown).

In the pickup feeding mechanism 4, a pickup feed gear 81 is formed with large and small gears, which are integrated into a unit form, those gear being larger in diameter than the pickup feed gear 81 in the first embodiment. A horizontal rotational drive force of the pickup feed gear 81 is converted into a rotational drive force perpendicular in direction to the former by a drive force converting mechanism 82 formed with gears being perpendicularly oriented. The converted drive force is transmitted to the lead screw 43.

3.2 Operation and Effects

Also in the third embodiment thus constructed, the drive force of the single loading motor 10 is capable of driving the disc introducing mechanism 70 and the pickup feeding mechanism 4.

In the disc loading/ejecting operation, the idler plate 64 is locked at the disc introducing position by the shift plate 75, and the disc introducing mechanism 70 is reliably driven by the drive force of the loading motor 10. In the disc reproducing operation and in the returning operation of the optical pickup, the idler plate 64 is locked at the pickup feed position by the idler lock plate 45, whereby the pickup feeding mechanism 4 is reliably driven by the drive force of the loading motor 10.

The disc player of the present embodiment, like that of the first embodiment, reduces the number of required motors by one motor when comparing with the disc player in which drive motors are respectively provided for driving the disc introducing mechanism and the pickup feeding mechanism for driving the latter. As a result, the number of components parts, inclusive of the support members and drive-force transmitting members, is reduced. The parts occupying space is reduced, and design freedom is improved. Further, the number of wires connecting to the motors is reduced. The fact leads to size reduction and simplification of the overall mechanism. Manufacturing cost is reduced by cost of one motor, and in this respect, the disc player is economical.

As in the first embodiment, in the respective operations, the idler plate 64 is locked at a given position. Accordingly, there is eliminated an erroneous operation of the idler plate 64, and hence an operation reliability of the device is excellent. In this case, the shift plate 25 as the select control member is used for the disc introducing locking means. The number of component parts required is reduced when comparing with the case using the dedicated locking member. The shifting operation from the disc loading operation to the optical pickup feeding operation and the shifting operation from the pickup returning operation to the disc ejecting operation are reliably performed, resulting in good operation reliability.

4th EMBODIMENT

4.1 Construction

Figure 14:
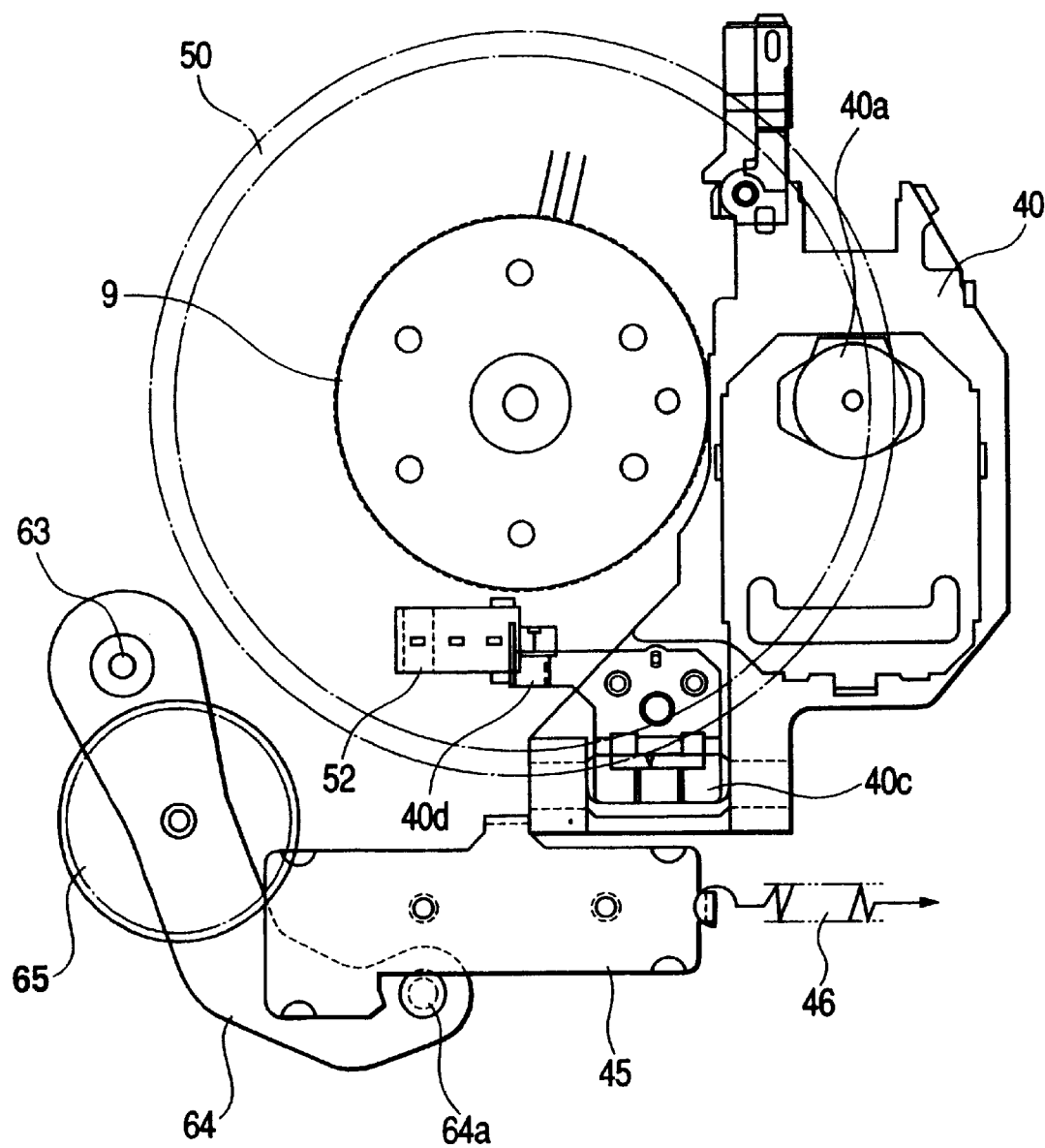
FIG. 14 is a view showing a disc player according to a fourth embodiment of the present invention.

FIG. 14 is a diagram showing a disc player which is a fourth embodiment of the present invention. Particularly, FIG. 14 is a plan view showing an initial state of a status detecting mechanism which utilizes an operation of the optical pickup. A basic arrangement of the disc player of this embodiment is substantially equal to that of the third embodiment disc player. The operation principles of the status detecting mechanism in this embodiment is substantially equal to that in the second embodiment. Therefore, only differences of the status detecting mechanism in the fourth embodiment from the status detecting mechanism in the second embodiment.

As shown in FIGS. 4A and 4B, in the embodiment, a detection switch 52 is located on the same side as of the screw holder 40c of the optical pickup 40, while it is located on the opposite side of the latter in the second embodiment. The detection switch 52 is pressed by a spring 40d protruded from a part of the screw holder 40c.

As in the second embodiment, the optical pickup 40 is pressed by the spring 40d when the optical pickup 40 is within a range from the disc innermost position as shown in FIG. 14 to the disc inner-rim side position. When the optical pickup 40 is moved to outside the disc inner-rim side position, the detector switch 51 is released from the urging by the spring 40d.

4.2 Operation and Effects

Also in this embodiment thus constructed, when the optical pickup 40 is positioned at the disc innermost position, the detection switch 52 is pressed by the spring 40d of the optical pickup 40 as in the second embodiment. When the optical pickup 40 moves from the disc innermost position to a position located outside the disc inner-rim position, the detection switch 52 is released to detect a chucking end. The optical pickup 40 is reversed in its advancing direction in accordance with a detection of the chucking end, and moves to a disc inner-rim side. At this time, the detection switch 52 once released is pressed again by the spring 40d of the optical pickup 40 to detect a disc inner-rim side position of the pickup.

In the thus constructed disc player of this embodiment, the single detection switch 52 is capable of detecting the chucking end and the disc inner-rim side position of the pickup by the utilization of the operation of the optical pickup 40, as in the second embodiment. Therefore, in the disc player of the fourth embodiment, the number of detecting elements required and the number of wires connecting to them are reduced when comparing with the conventional one in which the detecting element is provided for each purpose. The layout and design of related members are easy, and hence the construction of the overall mechanism is simplified.

5th EMBODIMENT

5.1 Construction

FIGS. 15 through 25 are diagrams showing a disc player which forms a fifth embodiment of the invention. Particularly, those figures are plan views showing a disc positioning mechanism 90 provided on the damper member 26. A basic construction of the disc player of the embodiment is substantially the same as of the disc player of the first embodiment. The floating lock mechanism and other mechanisms are substantially the same as the corresponding ones in the first embodiment. Therefore, description will be given about only the portions different from those of the first embodiment. In the description to follow, the lower part in the figures will be the front side (front) to which the disc is inserted, and the upper part will be the rear side (rear part) to which the disc is introduced.

Figures 15, 16, 17:
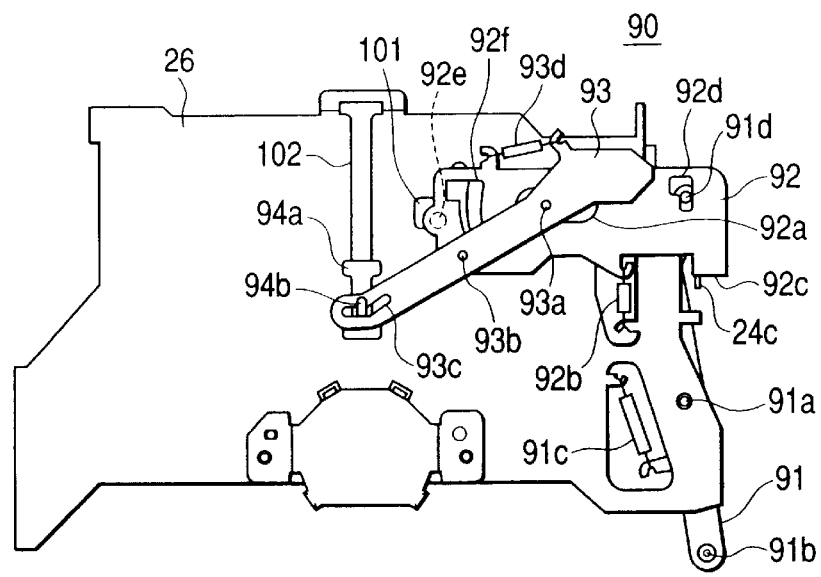
FIG. 15 is a plan view showing a disc player according to a fifth embodiment of the present invention.
FIG. 16 is a plan view showing the disc player of FIGS. 1A and 1B from which a stopper link is omitted.
FIG. 17 is a plan view showing the disc player of FIGS. 1A and 1B from which a lock link and a stopper link are omitted.

The disc player of the fifth embodiment of the invention will be described with reference to FIGS. 5 through 17. FIG. 15 is a plan view showing an example of vertical relationships of the members forming a disc positioning mechanism 90. FIG. 16 is a plan view showing the disc player, in which a stopper link 93 is omitted for the best illustration of an overall structure of an lock link 92. FIG. 17 is an opened-up view showing the disc player, in which the lock link 92 and the stopper link 93 are omitted for the best illustration of an overall configuration of a sensor arm 91 and a disc stopper 94.

As shown in FIG. 15, the disc positioning mechanism 90 of the embodiment is made up of the sensor arm 91, lock link 92, stopper link 93 and the disc stopper 94, which are provided on the damper member 26. The sensor arm 91, as shown in FIG. 17, is a narrow plate disposed at the right part of the damper member 26. The sensor arm 91 may be horizontally turned about a shaft 91a located at the midpoint of the sensor arm. The edge of the inserted disc is in contact with the front end of the sensor arm 91. A pin 91b is provided at the front end of the sensor arm 91. The pin 91b retracts to the right with rotation of the sensor arm 91. The sensor arm 91 is urged in the clockwise direction in the drawing by a spring 91c attached to between it and the damper member 26. A pin 91d stands upright on the rear end of the sensor arm 91.

The lock link 92 is a long member extending horizontally, as shown in FIG. 16, and is located in the rear right part of the damper member 26. An elongated hole 92a is formed in the mid portion of the lock link 92. A shaft portion 100 provided on the damper member 26 is inserted into the elongated hole 92a, whereby the lock link 92 is slidable in the horizontal direction and may be turned along a horizontal plane. The lock link 92 is urged in the clockwise direction by a spring 92b attached to between it and the damper member 26.

A pressing member 92c is provided in a portion on the front right of the lock link 92. The pressing member 92c presses the trigger engaging part 24c of the rack plate 24 in the first embodiment shown in FIGS. 1 through 9 when the lock link is turned clockwise. An L-shaped hole 92d through which the pin 91d of the sensor arm 91 is inserted is provided in a portion on the rear right of the lock link 92.

A circular protrusion 92e, protruded downward, is provided at the left end of the lock link 92. The circular protrusion 92e is inserted into a restricting hole 101 formed in the damper member 26. The restricting hole 101 includes an arcuate part 101a as a circle part and a rectangular cutout 101b protruded to the left from the its mid portion, as shown in FIG. 17. The cutout 101b restricts an amount of movement of the circular protrusion 92e with provision of a play, and restricts an amount of turn of the lock link 92. The arcuate part 101a provides a path for a pin 93b of the stopper link 93 to be described later. A restricting hole 92f is formed in the left end part of the lock link 92. The restricting hole 92f includes an arcuate part 92g as a circle part and cutouts 92h protruded to the left from both ends of the arcuate part.

The stopper link 93, as shown in FIG. 15, is a long plate extending in the horizontal direction, and is placed on the lock link 92. The stopper link 93 may be turned, along a horizontal plane, about a shaft 93a of the shaft portion 100 of the damper member 26 at a position deviated a little to the right of its middle. The pin 93b is provided at a position a little to the left of the middle of the stopper link 93. The stopper link 93 is inserted into the restricting hole 92f of the lock link 92 and the restricting hole 101 of the damper member 26.

A V-shaped slide hole 93c is formed in the left end part of the stopper link 93. A spring 93d is attached to between the stopper link 93 and the lock link 92. The spring 93d urges the stopper link 93 in the counterclockwise direction and urge the lock link 92 to the right.

The disc stopper 94, as shown in FIG. 17, is a member long in the horizontal direction and a slide member 94a is provided at the middle thereof. The slide member 94a is slidably coupled to a slide groove 102, extending in the disc introducing direction, formed in the damper member 26. A coupling part 94b, which is inserted into the slide hole 93c of the stopper link 93, is provided on the slide member 94a. Guide parts 94c are provided at both ends of the disc stopper 94. The rear edge of the disc will be brought into contact with the guide parts 94c.

5.2 Operation

In the thus constructed disc player of the embodiment, the disc positioning mechanism 90 is capable of automatically positioning a 12 cm or 8 cm disc onto the turntable, and the clamper member 26 chucks the disc thereon. An initial state, and a sequence of disc loading, disc chucking and disc ejecting operations will be successively described with reference to FIGS. 18 through 25. In those figures, the members of the disc positioning mechanism 90 are indicated by solid lines, but vertical relationships among those members are similar to those shown in FIGS. 15 through 17.

[Initial State]

Figure 18:
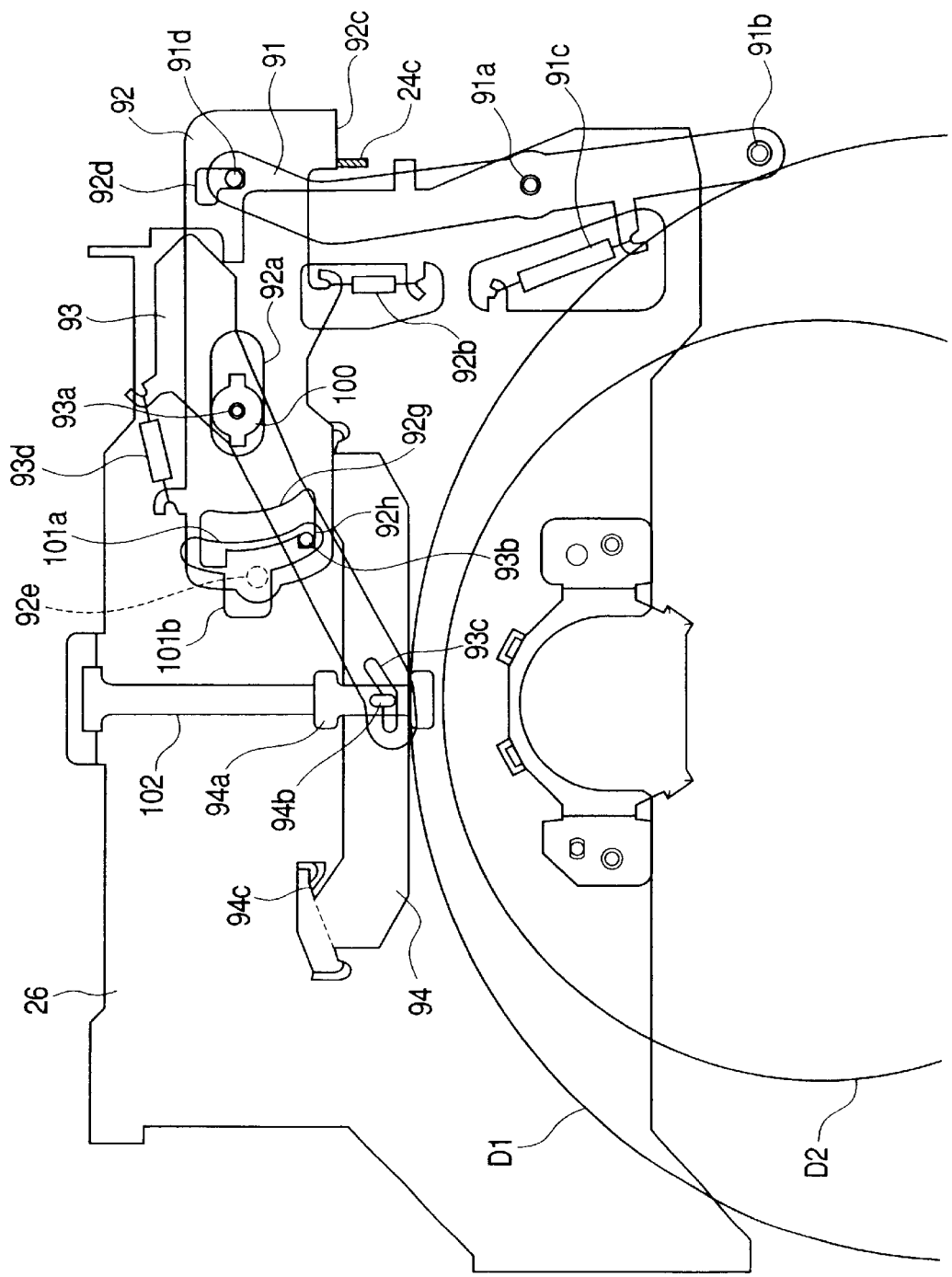
FIG. 18 is a plan view showing a state of the disc player of FIGS. 1A and 1B that loading of a 12 cm or 8 cm disc into the disc player starts from an initial state.

As shown in FIG. 18, in an initial state, the stopper link 93 is urged counterclockwise. The coupling part 94b of the disc stopper 94 coupled to the slide hole 93c at the front end of the stopper link 93 is located at the front end of the slide groove 102 of the damper member 26, and the disc stopper 94 is located close to the turntable.

Since the lock link 92 is horizontally urged by the spring 93d, the pin 93b of the stopper link 93 is put in the hole 92d at the front part of the restricting hole 92f of the lock link 92. Accordingly, its turn is restricted. Since the lock link 92 is urged to the right, the pin 91d of the sensor arm 91 is put at the front part of the L-shaped hole 92d of the lock link 92, and horizontally urged. And the sensor arm 91 is urged in the clockwise direction by the spring 91c, so that the pin 91b is urged toward the turntable (inward).

[Loading Operation of a 12 cm Disc]

In the initial state mentioned above, as shown in FIG. 18, a disc D1 of 12 cm in diameter is inserted through the disc insertion slit into the disc player. Then, the disc D1 is transported onto the turntable along a horizontal plane. During the disc transportation, the edge of the disc D1 comes in contact with the pin 91b of the sensor arm 91, so that it is pushed outward (to the right in the figure). Accordingly, the sensor arm 91 is turned counterclockwise while resisting the urging force of the spring 91c.

Figure 19:
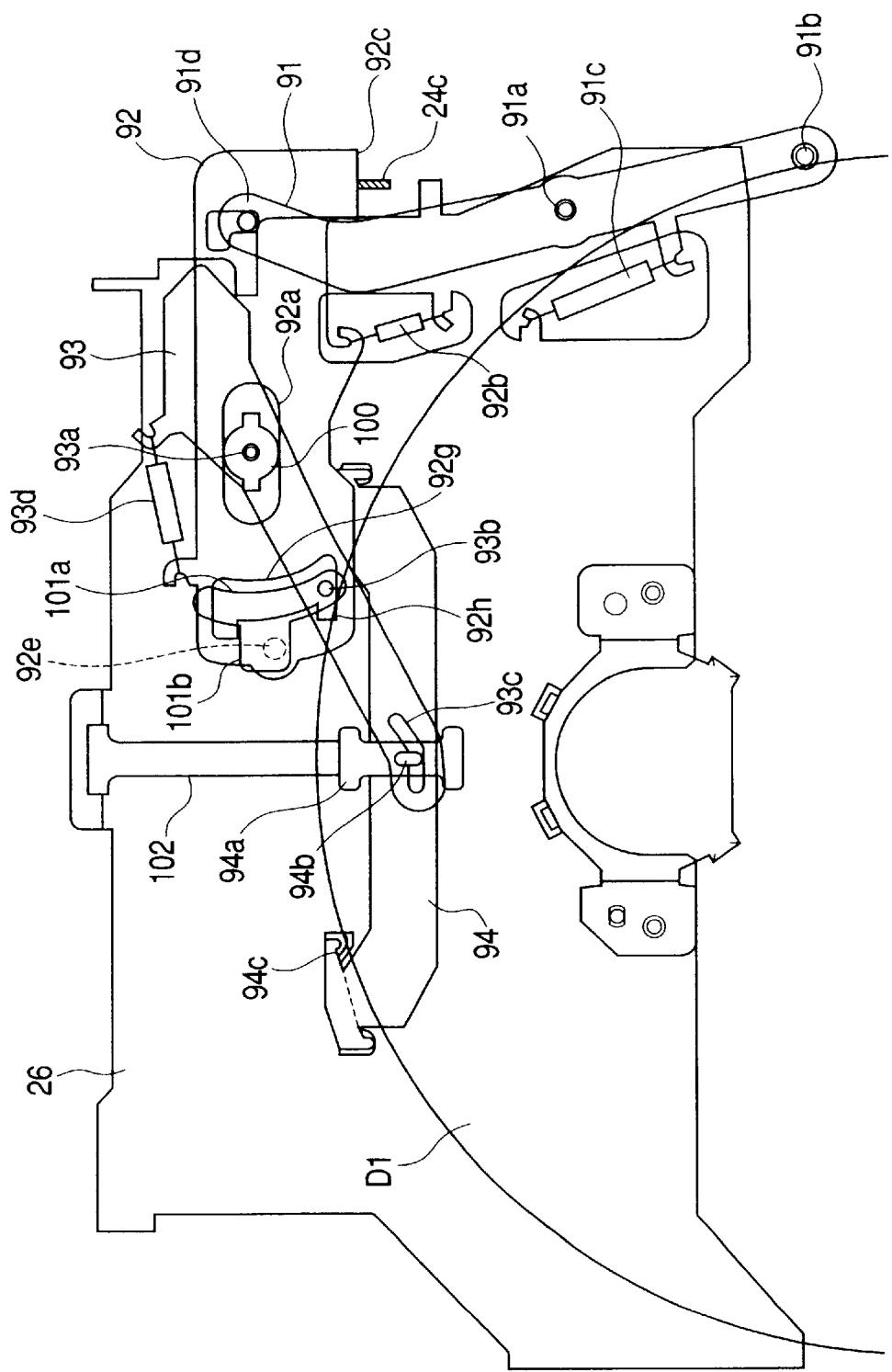
FIG. 19 is a plan view showing a state of the disc player of FIGS. 1A and 1B that at the time of loading a 12 cm disc, the stopper link is released from its locked state by the lock link.

In turn, as shown in FIG. 19, the pin 91d of the sensor arm 91 urges the hole 92d of the lock link 92 to the left. Accordingly, the lock link 92 slides to the left. With the movement of the lock link 92, the pin 93b of the stopper link 93 moves out of the cutouts 92h at the front part of the restricting hole 92f of the lock link 92, and moves into the arcuate part 92g, whereby the turn of the stopper link 93 in the clockwise direction is allowed.

Figure 20:
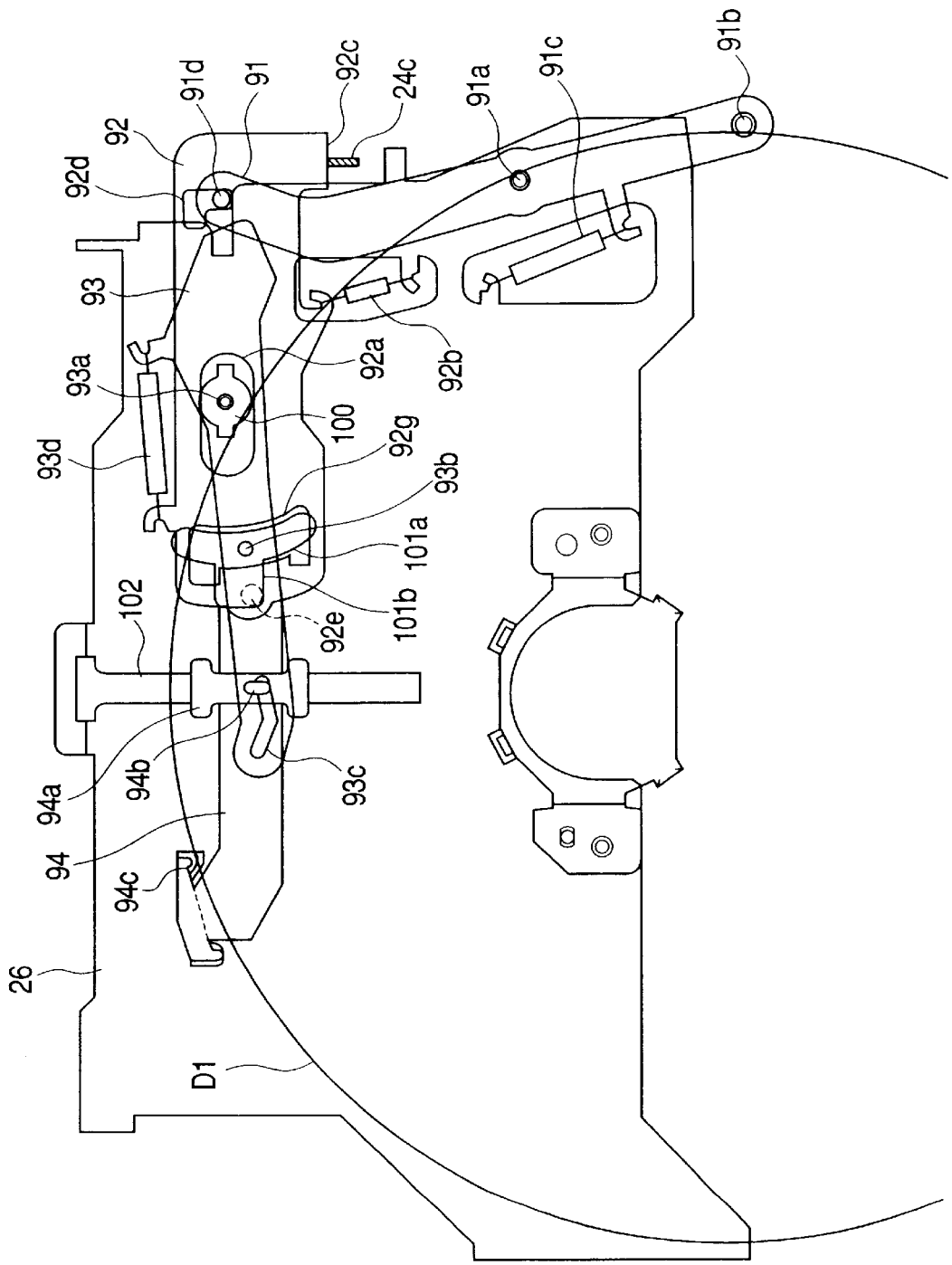
FIG. 20 is a plan view showing a state of the disc player of FIGS. 1A and 1B that at the time of loading a 12 cm disc, the disc stopper is moving.

At the same time, the rear edge of the disc D1 comes in contact with the guide parts 94c of the disc stopper 94 to move it rearward. In turn, the disc stopper 94 moves backward, and the stopper link 93 starts to turn clockwise. When the stopper link 93 is thus turned, the pin 93b, as shown in FIG. 20, moves to the rear end along the arcuate part 92g of the restricting hole 92f of the lock link 92 and the arcuate part 101a of the restricting hole 101 of the clamper member 26.

Figure 21:
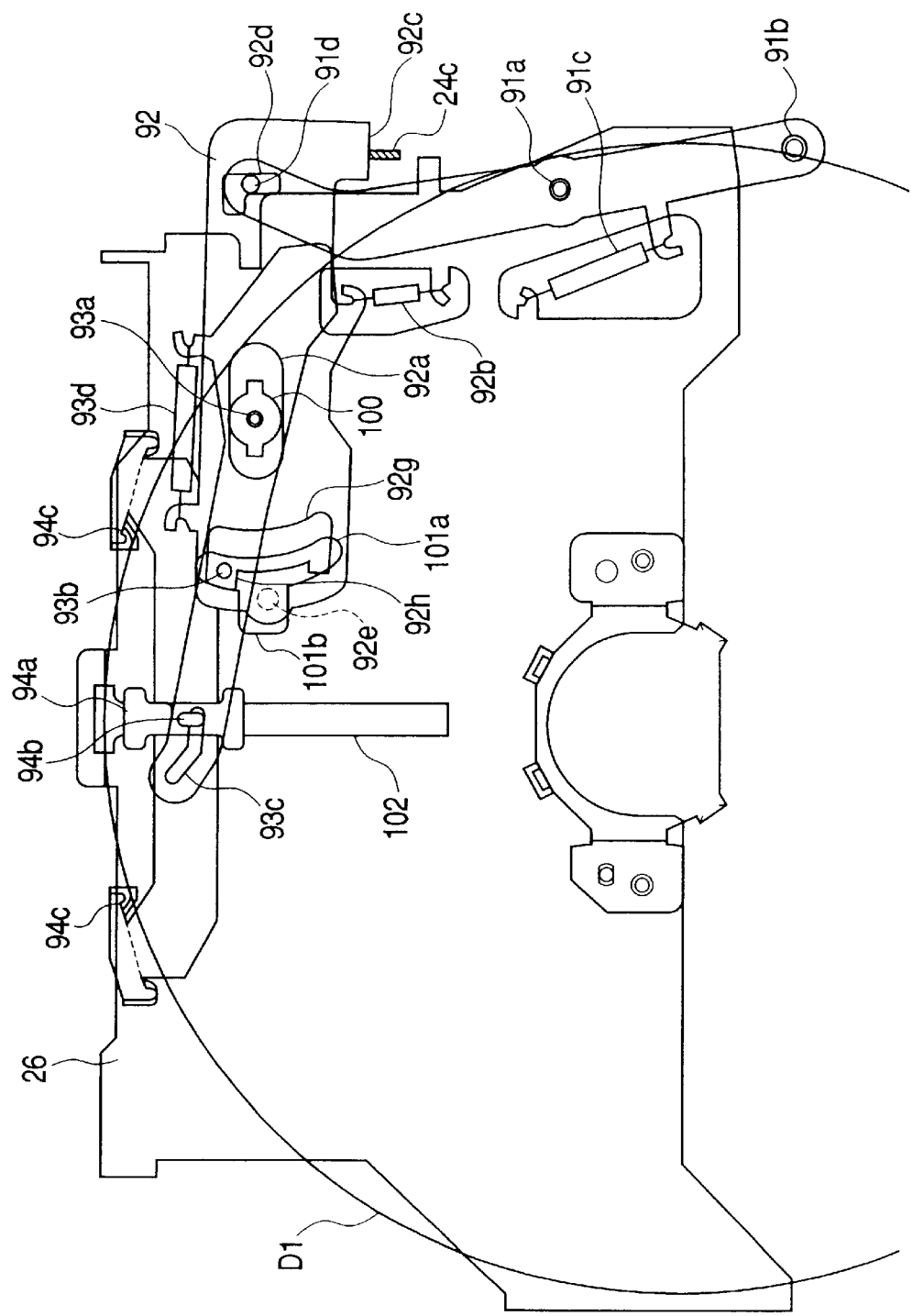
FIG. 21 is a plan view showing a state of the disc player of FIGS. 1A and 1B that at the time of loading a 12 cm disc, the stopper link is locked by the lock link.

As shown in FIG. 21, when the summit of the arcuate rim of the right side edge of the disc D1 passes the pin 91b of the sensor arm 91, the sensor arm 91 then turns clockwise by the urging force of the spring 91c of the sensor arm 91. At this time, the pin 91d of the sensor arm 91 urges the L-shaped hole 92d of the lock link 92 to the right, so that the lock link 92 slides to the right. With the movement of the lock link 92, the pin 93b of the stopper link 93 is put at the disc drive motor 92b at the rear part of the restricting hole 92f of the lock link 92. The clockwise turn of the stopper link 93 is restricted with a fixed play.

Figure 22:
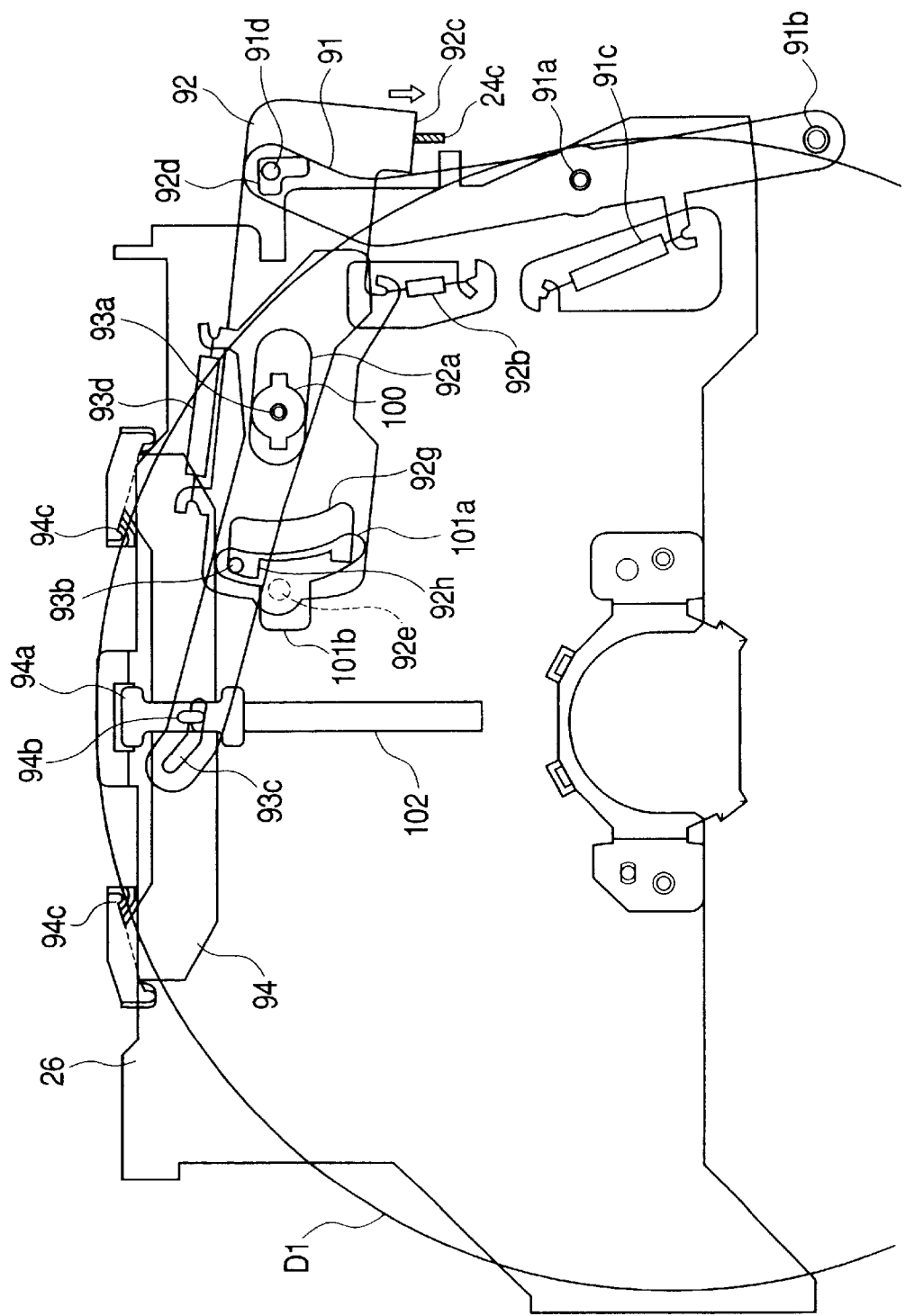
FIG. 22 is a plan view showing a state of the disc player of FIGS. 1A and 1B that at the time of loading a 12 cm disc, the lock link turns to press a trigger engaging part.

When the rear end of the disc D1 presses the guide parts 94c as shown in FIG. 22, the disc stopper 94 moves backward a slight distance of the play of the pin 93b. In turn, the pin 93b of the stopper link 93 presses the rear end of the cutouts 92h to turn the lock link 92 clockwise.

The pressing member 92c provided at the right end of the lock link 92 moves frontward, and presses the trigger engaging part 24c of the rack plate 24. When the trigger engaging part 24c is pressed, the rack plate 24 moves to be in mesh with the pinion gear 23, as described in the first embodiment. The turn of the lock link 92 is restricted to be within a predetermined amount of turn since its circular protrusion 92e comes in contact with the cutout 101b of the restricting hole 101.

Figure 23:
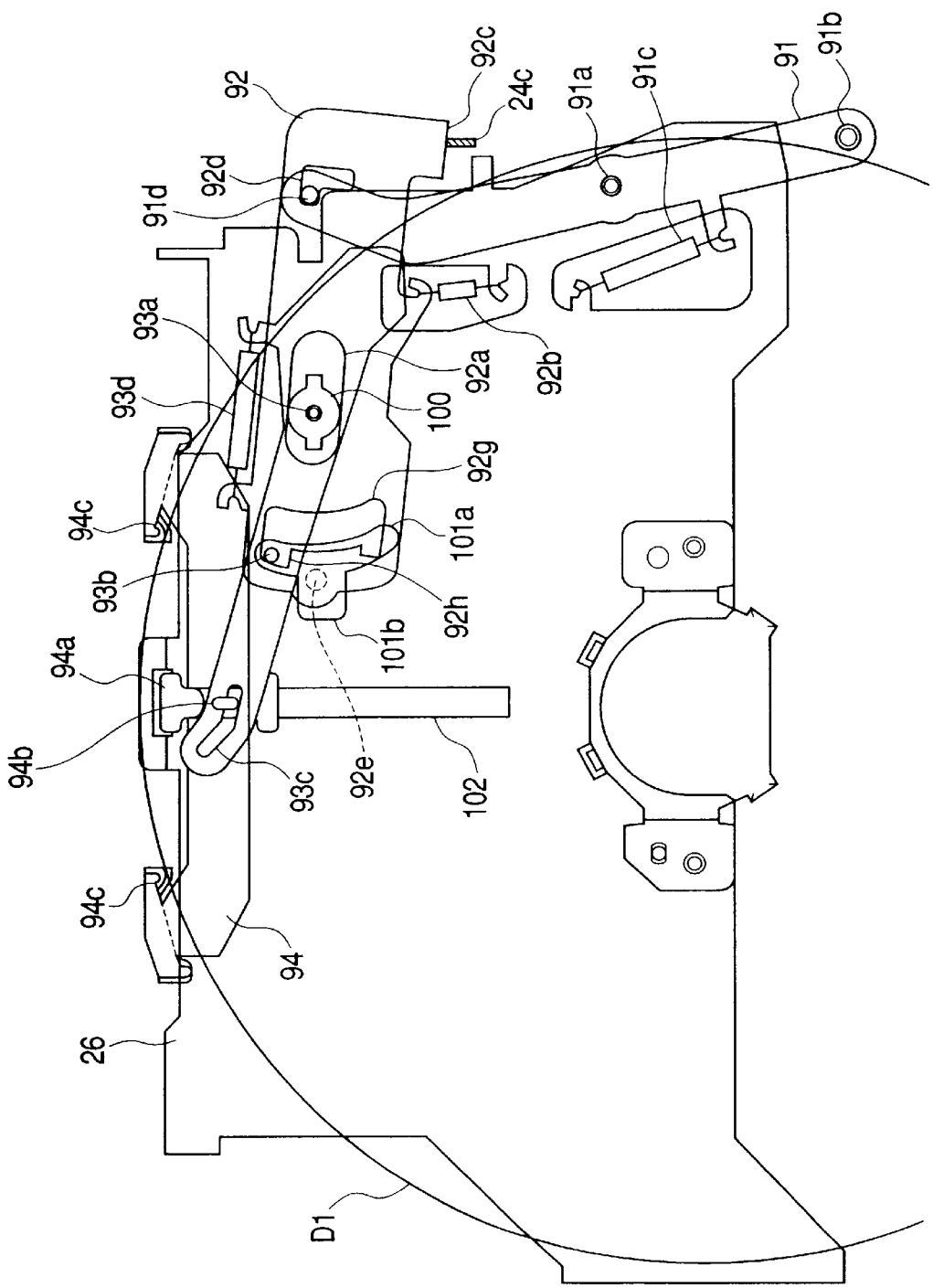
FIG. 23 is a plan view showing a state of the disc player of FIGS. 1A and 1B that a 12 cm disc is positioned.

Thereafter, the transport roller member 30 is put at the releasing position, and the disc D1 introducing operation stops. Then, as shown in FIG. 23, the stopper link 93 is slightly turned counterclockwise by the urging force of the spring 93d by an amount of turn corresponding to a play of the pin 93b, and the disc D1 is positioned at the chucking position by the disc stopper 94.

[8 cm Disc Loading]

Description to follow is elaboration of a case where in the initial state, as shown in FIG. 18, a disc D2 of 8 cm, not 12 cm, in diameter, is inserted into the disc player through the disc insertion slit. In this case, the disc D2 is transported onto the turntable along a horizontal plane as in the first embodiment. However, in this case, the edge of the disc D2 does not contact with the pin 91b of the sensor arm 91, unlike the case of the 12 cm disc. Therefore, the leftward movement of the lock link 92 by the turn of the sensor arm 91 does not occur. Accordingly, the pin 93b of the stopper link 93 is held at the cutouts 92h of the front part of the restricting hole 92f of the lock link 92. The leftward turn of the stopper link 93 remains restricted with presence of a fixed play.

Figure 24:
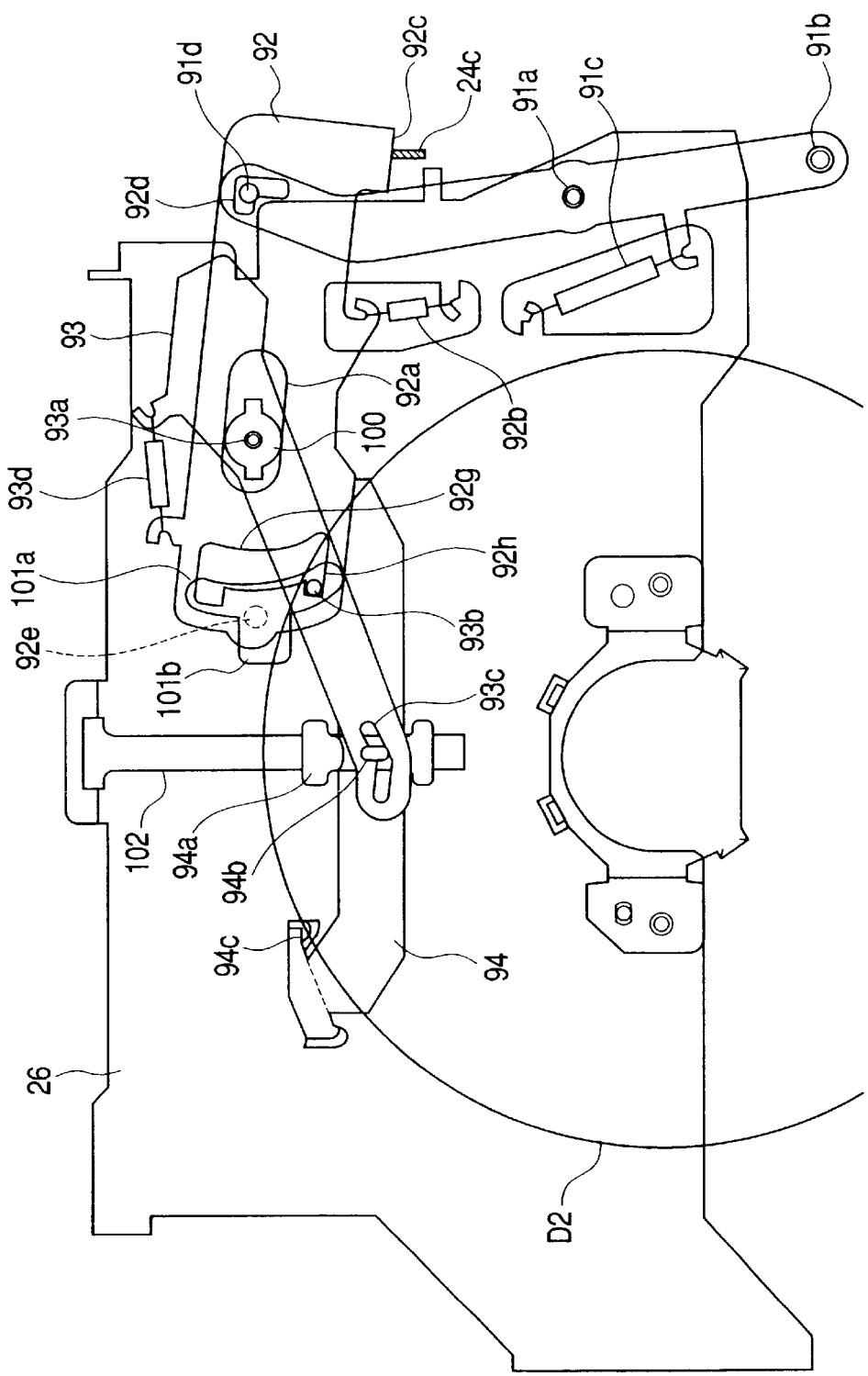
FIG. 24 is a plan view showing a state of the disc player of FIGS. 1A and 1B that at the time of loading a 8 cm disc, the lock link turns to press a trigger engaging part.
Figure 25:
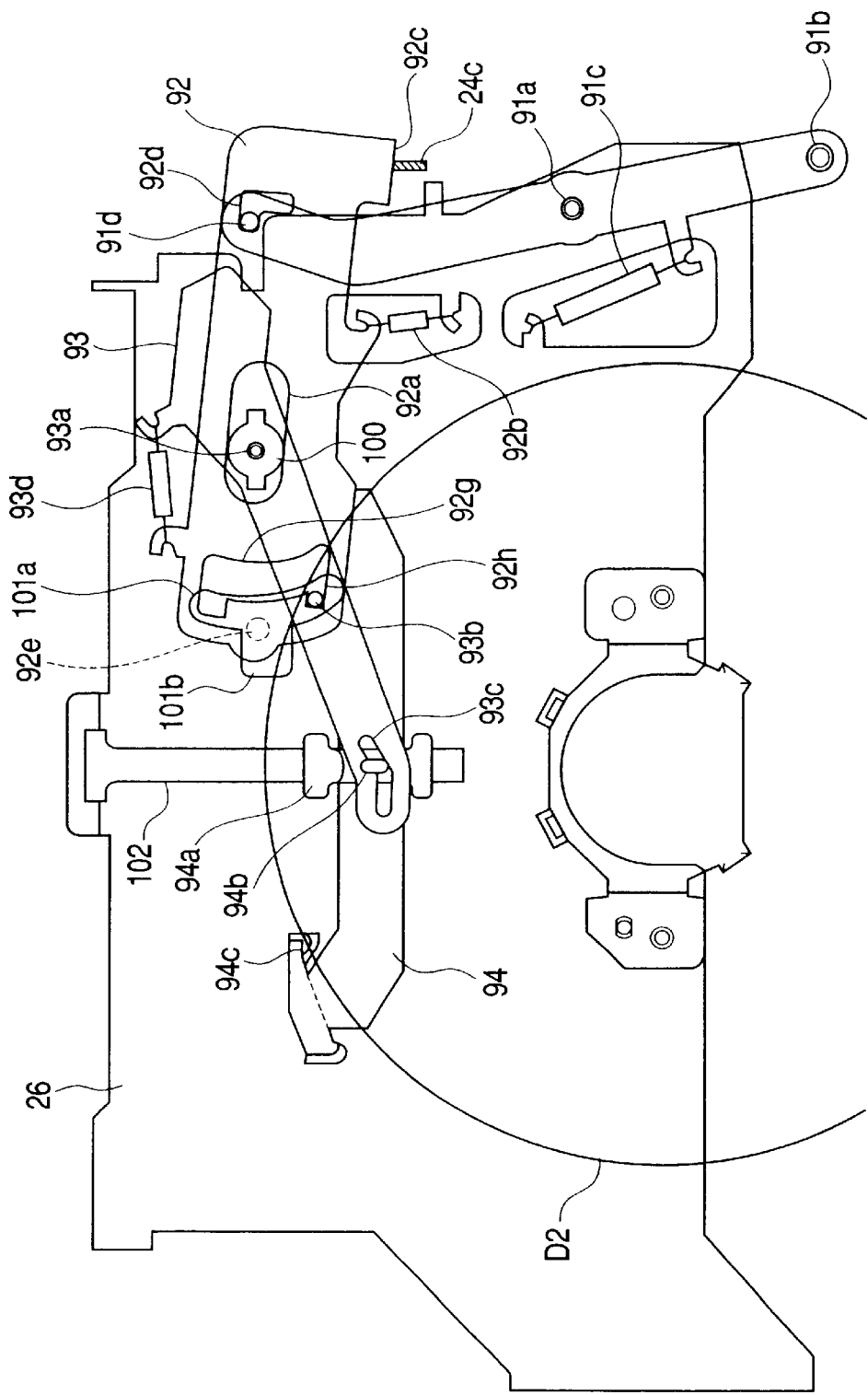
FIG. 25 is a plan view showing a state of the disc player of FIGS. 1A and 1B that an 8 cm disc is positioned.

When the guide parts 94c is pressed by the rear end of the disc D2 as shown in FIG. 24, the disc stopper 94 slightly moves backward. Accordingly, the pin 93b of the stopper link 93 presses the rear end of the spring 92b and the lock link 92 turns clockwise. And the pressing member 92c provided at the right end of the lock link 92 moves frontward to press the trigger engaging part 24c of the rack plate 24. When the trigger engaging part 24c is pressed, the rack plate 24 moves into engagement with the pinion gear 23 as described in the first embodiment. At this time, the turn of the lock link 92 is restricted within a predetermined amount of turn since the circular protrusion 92e comes in contact with the cutout 101b of the restricting hole 101.

Thereafter the transport roller member 30 is put at the releasing position and the introducing operation of the disc D2 stops. In turn, the stopper link 93 slightly turns counterclockwise by a turn amount corresponding to the play of the pin 93b, and the disc D2 is positioned at the chucking position by the disc stopper 94.

[Disc Chucking Operation]

As described above, the disc (D1 or D2) is transported onto the turntable by the transport-roller drive mechanism 3, and the rack plate 24 comes in engagement with the pinion gear 23. Thereafter, the disc (D1 or D2) is chucked and information of the disc (D1 or D2) is reproduced as in the first embodiment.

[Disc Ejecting Operation]

The disc (D1 or D2) is discharged by the transport roller as in the embodiment mentioned above. The edge of the 12 cm disc D1, as shown in FIG. 21, comes in contact with the pin 91b of the sensor arm 91 and is pushed outward. The sensor arm 91 turns counterclockwise while resisting the urging force of the spring 91c. Then, the pin 91d of the sensor arm 91 urges the L-shaped hole 92d to the left, so that the lock link 92 moves to the left. With the movement of the lock link 92, the pin 93b of the stopper link 93 moves out of the cutouts 92h of the restricting hole 92f of the lock link 92, and moves to the arcuate part 92g, thereby allowing the stopper link 93 to turn clockwise.

As shown in FIG. 20, the stopper link 93 is turned counterclockwise by the urging force of the spring 93d. The disc stopper 94 moves frontward while pressing the rear edge of the disc D1. The pin 93b of the stopper link 93 moves to the front end along the arcuate part 92g of the restricting hole 92f of the lock link 92 and the arcuate part 101a of the restricting hole 101 of the clamper member 26.

When as shown in FIG. 19, the summit of the arcuate part of the right side edge of the disc D1 passes the pin 91b of the sensor arm 91, the sensor arm 91 is urged by the urging force of the spring 91c of the sensor arm 91. At this time, the pin 91d of the sensor arm 91 urges the L-shaped hole 92d of the lock link 92 to the right, so that the lock link 92 slides to the right. With the movement of the lock link 92, as shown in FIG. 18, the pin 93b of the stopper link 93 moves tot he cutouts 92h at the front part of the restricting hole 92f of the lock link 92, so that it returns to the initial state in which the clockwise turn of the stopper link 93 is restricted.

In the operation of ejecting the 8 cm disc D2, the disc stopper 94 is at the front initial position, and edge of the disc D2 does not contact with the pin 91b of the sensor arm 91. Therefore, the disc positioning mechanism 90 does not operate in particular.

5.3 Effects

As described above, in the embodiment, the disc positioning mechanism 90 automatically selects the 12 cm disc D1 or the 8 cm disc D2 and appropriately positions the selected one without any special drive force. Therefore, further reduction of the number of required component parts and saving of power consumption are realized.

In each embodiment described above, the disc rotating mechanism, disc introducing mechanism, pickup feeding mechanism and others are provided on the base plate 5. In this case, if the disc positioning mechanism 90 is disposed on the fixed side, not the base plate, it is easy to displace in some locking states of the base plate 5. However, in the embodiment, the disc positioning mechanism 90 is provided on the damper member 26 on the base plate 5. It is not influenced by a floating locking state. Therefore, the disc diameter may be recognized precisely, and the disc may be positioned also precisely. Device reliability is achieved.

OTHER EMBODIMENTS

While the present invention has been described by use of some specific embodiments, it should be understood that the invention is not limited to those embodiments, but may variously be modified, altered and changed within the true spirits of the invention. For example, the construction of the specific select mechanism including the number of idler gears and the layout of them, and the construction of the drive force transmission system ranging from the select mechanism to the disc introducing mechanism and the pickup feeding mechanism may appropriately be selected. The specific construction of locking means for locking the idler plate and the specific construction of the status detecting mechanism including detecting elements may also be selected appropriately. The same thing is true for the disc introducing mechanism, the pickup feeding mechanism, the disc positioning mechanism and the like.

The present invention may be applied to various disc players which handle one or a plurality of kinds of discs selected from among discs of CD, MD, LD, DVD and the like. In either case, the invention produces good results. For example, the size of the disc recognized by the disc positioning mechanism is not limited to the discs of 12 cm and 8 cm. The invention may be applied to every kind of disc if the design size of each member is appropriately selected.

As described above, in the invention, the number of drive sources is reduced by selectively driving the disc introducing mechanism or the pickup feeding mechanism by a single drive source. Further, the number of detecting elements is reduced since both the chucking end and the disc inner-rim side position of the pickup are detected by a single detecting element. Accordingly, that results in reduction of the number of the motors and the detecting elements, and the number of related members inclusive of wires. Additional advantages of the disc player of the invention are improvement of parts layouts and design freedom, size reduction and simplification of the overall mechanism, cost reduction, and the like.

What is claimed is:

1. A disc player comprising:
   a chassis;
   an elastic member;
   a turntable;
   a base member supported on the chassis via the elastic member;
   a disc rotating mechanism for rotating a disc on the turntable, the disc rotating mechanism disposed on the base member;
   a disc introducing mechanism for introducing the disc onto the turntable, the disc introducing mechanism disposed on the base member;
   an optical pickup for reading information in the disc;
   a pickup feeding mechanism for moving the optical pickup in a radial direction of the disc, the pickup feeding mechanism disposed on the base member;
   a disc positioning mechanism for positioning the disc on the turntable in accordance with a diameter of the disc, the disc positioning mechanism disposed on the base member;
   a floating lock mechanism for fixing the base member at a predetermined position on the chassis; and
   a select mechanism for selectively transmitting a drive force from a single drive source to one of the disc introducing mechanism and the pickup feeding mechanism.

2. The disc player according to claim 1, wherein the disc positioning mechanism comprises:
   a disc stopper for positioning the disc on the turntable, the disc stopper urged by the disc introduced by the disc introducing mechanism to be movable;
   a lock portion movable between a lock position for locking the disc stopper at a position based on the diameter of the disc and a lock removal position allowing the disc stopper to move; and
   a sensor portion for detecting the diameter of the disc by being brought into contact with the disc, thereby controlling the lock portion.

3. The disc player according to claim 1, wherein the select mechanism includes a select member movable between a disc introducing position for transmitting the drive force to the disc introducing mechanism and a pickup feeding position for transmitting the drive force to the pickup feeding mechanism;
   the disc introducing mechanism includes disc introducing locking means for locking the select member at the disc introducing position in a disc introducing operation; and
   the pickup feeding mechanism includes pickup feed locking means for locking the select member at the pickup feeding position i a pickup feeding operation.

4. The disc player according to claim 3, wherein the disc introducing locking means is provided at a part of an operating member forming the disc introducing mechanism; and the disc introducing locking means removes the locking of the select member when the operating member reaches an operation end position.

5. The disc player according to claim 3, wherein the disc introducing locking means is provided at a part of a select control member for selectively controlling the chucking of the disc to the turntable, and the disc introducing locking means removes the locking of the select member when the operation member reaches a chucking end position.

6. The disc player according to claim 3, wherein the optical pickup is positioned at a disc innermost position located more innerly than a disc inner-rim position allowing the optical pickup to read information in an inner area of an information recording area of the disc when the disc introducing mechanism operates, and when the optical pickup is at the disc innermost position, the pickup feeding locking means is held on a locking removal side, and when the optical pickup is located at the disc inner-rim side position and outside the disc inner-rim side position as radially viewed, the pickup feeding locking means is released and locks the select member at a pickup feeding position by the pickup feeding locking means.

7. The disc player according to claim 3, wherein the select mechanism comprises:
   a drive gear constantly coupled to the single drive source4, and the drive gear rotated by a drive force of the drive source;
   an idler plate provided a the select member, the idler plate turning between an disc introducing position and a pickup feeding position by a friction interacting with the drive gear in accordance with a rotational direction of the drive gear; and
   an idler gear being attached to ne end of the idler gear to be constantly coupled to the drive gear, the idler gear being arranged such that the idler gear revolves with respect to the drive gear with the turn of the idler gear, when the idler gear is at the disc introducing position, the idler gear is coupled to the disc introducing mechanism, and when the idler plate is at the pickup feeding position, the idler gear is coupled to the pickup feeding mechanism.

8. The disc player according to claim 7, wherein the idler gear comprises:
   a disc introducing idler gear to be coupled to the disc introducing mechanism when the idler plate is at the disc introducing position; and
   a pickup feeding idler gear, provided separately from the disc introducing idler gear, to be coupled to the pickup feeding gear when the idler plate is at the pickup feeding position.

9. The disc player according to claim 7, wherein the disc introducing mechanism comprises:
   a select control mechanism arranged such that the select control mechanism selectively controls a damper member for chucking the disc on the turntable between the chucking side and the releasing side, and selectively controlling a transport roller for transporting the disc onto the turntable along a horizontal plane between a disc contact side and a disc releasing side; and a transport toiler drive mechanism for driving the transport roller to turn, wherein the idler gear comprises a select control idler gear to be coupled to the select control mechanism when the idler plate is at the disc introducing position;

a transport roller drive idler gear, provided separately from the select control idler gear, to be coupled to the transport roller dive mechanism when the idler plate is at the disc introducing position; and a pickup feeding idler gear, provided separately from the select control idler gear and the transport roller drive idler gear, to be coupled tot he pickup feeding idler gear when the idler plate is at the pickup feeding position.

10. The disc player according to claim 1, further comprising a detecting element for detecting that the optical pickup is at a disc inner-rim side position where the optical pickup reads information in an inner area of the information recoding area of the disc, and for detecting the end of chucking the disc on the turntable.

11. The disc player according to claim 10, wherein the optical pickup is positioned at the disc inner-rim side position when the disc introducing mechanism operates; and the detecting element detects a disc chucking operation end during a period that after the operation of the disc introducing mechanism ends, the optical pickup moves outward from the disc innermost position and reaches a position outside the disc inner-rim side position as radially viewed, and the detecting element detects that the optical pickup is at a disc inner-rim side position during a period that the optical pickup moves toward the disc inner-rim side and reaches the disc inner-rim side position.

12. The disc player according to claim 11, wherein the select mechanism comprises a select member movable between a disc introducing position for transmitting a drive force to the disc introducing position for transmitting a drive force to the disc introducing mechanism and a pickup feeding position for transmitting a drive force to the pickup feeding mechanism;

the disc introducing mechanism comprises disc introducing locking means for locking the select member at the disc introducing position in a disc introducing operation;

the pickup feeding mechanism comprises pickup feed locking means for locking the select member at the pickup feeding position in a pickup feeding operation; and when the optical pickup is at the disc innermost position, the pickup feeding locking means is held on the locking removal side, and when the optical pickup is located at the disc inner-rim side position and outside the disc inner-rim side position as radially viewed, the pickup feeding position by the pickup feeding locking means.

13. The disc player according to claim 11, wherein the detecting element is a detecting switch pressed by the optical pickup when the optical pickup is within a range form the disc innermost position to the disc inner-rim side position, and the detecting switch is separated from the optical pickup when the optical pickup moves outside the disc inner-rim position as radially viewed.

14. The disc player according to claim 10, wherein the pickup feeding mechanism includes a lead screw engaged with one end of the optical pickup to rectilinearly moves the optical pickup, and the detecting element is disposed on the opposite end of the optical pickup.

15. A disc player comprising:

a chassis;

an elastic member;

a turntable;

a base member supported on the chassis via the elastic member;

a disc rotating mechanism for rotating a disc on the turntable, the disc rotating mechanism disposed on the base member;

a disc introducing mechanism for introducing the disc onto the turntable, the disc introducing mechanism disposed on the base member;

an optical pickup for reading information in the disc;

a pickup feeding mechanism for moving the optical pickup in a radial direction of the disc, the pickup feeding mechanism disposed on the base member;

a disc positioning mechanism for positioning the disc on the turntable in accordance with a diameter of the disc, the disc positioning mechanism disposed on the base member;

a floating lock mechanism for fixing the base member at a predetermined position on the chassis; and a select mechanism for selectively transmitting a drive force from a single drive source to only one of the disc introducing mechanism and the pickup feeding mechanism.

16. The disc player according to claim 15, wherein the select mechanism includes a select member movable between a disc introducing position for transmitting the drive force to the disc introducing mechanism and a pickup feeding position for transmitting the drive force to the pickup feeding mechanism;

the disc introducing mechanism includes disc introducing locking means for locking the select member at the disc introducing position in a disc introducing operation; and the pickup feeding mechanism includes pickup feed locking means for locking the select member at the pickup feeding position in a pickup feeding operation.

17. The disc player according to claim 16, wherein the disc introducing locking means is provided at a part of an operating member forming the disc introducing mechanism; and the disc introducing locking means removes the locking of the select member when the operating member reaches an operation end position.

18. The disc player according the claim 17, wherein the disc introducing locking means is provided at a part of a select control member for selectively controlling the chucking of the disc to the turntable, and the disc introducing locking means removes the locking of the select member when the operation member reaches a chucking end position.

19. The disc player according to claim 16, wherein the optical pickup is positioned at a disc innermost position located more innerly than a disc inner-rim position allowing the optical pickup to read information in an inner area of an information recording area of the disc when the disc introducing mechanism operates, and when the optical pickup is at the disc innermost position, the pickup feeding locking means is held on a locking removal side, and when the optical pickup is located at the disc inner-rim side position and outside the disc inner-rim side position as radially viewed, the pickup feeding locking means is released and locks the select member at a pickup feeding position by the pickup feeding locking means.

20. The disc player according to claim 16, wherein the select mechanism comprises:
   a drive gear constantly coupled to the single drive source, and the drive gear rotated by a drive force of the drive source;
   an idler plate provided as the select member, the idler plate turning between a disc introducing position and a pickup feeding position by a friction interacting with the drive gear in accordance with a rotational direction of the drive gear; and
   an idler gear being attached to one end of the idler gear to be constantly coupled to the drive gear, the idler gear being arranged such that the idler gear revolves with respect to the drive gear with the turn of the idler gear, when the idler gear is at the disc introducing position, the idler gear is coupled to the disc introducing mechanism, and when the idler plate is at the pickup feeding position, the idler fear is coupled to the pickup feeding mechanism.

21. The disc player according to claim 20, wherein the idler gear comprises:
   a disc introducing idler gear to be coupled to the disc introducing mechanism when the idler plate is at the disc introducing position; and
   a pickup feeding idler gear, provided separately from the disc introducing idler gear, to be coupled to the pickup feeding gear when the idler plate is at the pickup feeding position.

22. The disc player according to claim 20, wherein the disc introducing mechanism comprises:
   a select control mechanism arranged such that the select control mechanism selectively controls a damper member for chucking the disc on the turntable between the chucking side and the releasing side, and selectively controlling a transport roller for transporting the disc onto the turntable along a horizontal plane between a disc contact side and a disc releasing side; and
   a transport roller drive mechanism for driving the transport roller to turn,
   wherein the idler gear comprises a select control idler gear to be coupled to the select control mechanism when the idler plate is at the disc introducing position;
   a transport roller drive idler gear, provided separately from the select control idler gear, to be coupled to the transport roller drive mechanism when the idler plate is at the disc introducing position; and
   a pickup feeding idler gear, provided separately from the select control idler gear and the transport roller drive idler gear, to be coupled to the pickup feeding idler gear when the idler plate is at the pickup feeding position.

23. The disc player according to claim 15 further comprising a detecting element for detecting that the optical pickup is at a disc inner-rim side position where the optical pickup reads information in an inner area of the information recoding area of the disc, and for detecting the end of chucking the disc on the turntable.

24. The disc player according to claim 23, wherein the optical pickup is positioned at the disc inner-rim side position when the disc introducing mechanism operates; and
   the detecting element detects a disc chucking operation end during a period that after the operation of the disc introducing mechanism ends, the optical pickup moves outward from the disc innermost position and reaches a position outside the disc inner-rim side position as radially viewed, and the detecting element detects that the optical pickup is at a disc inner-rim side position during a period that the optical pickup moves toward the disc inner-rim side and reaches the disc inner-rim side position.

25. The disc player according to claim 24, wherein the select mechanism comprises a select member movable between a disc introducing position for transmitting a drive force to the disc introducing mechanism and a pickup feeding position for transmitting a drive force to the pickup feeding mechanism;
   the disc introducing mechanism comprises disc introducing locking means for locking the select member at the disc introducing position in a disc introducing operation;
   the pick up feeding mechanism comprises pickup feed locking means for locking the select member at the pickup feeding position in a pickup feeding operation; and
   when the optical pickup is at the disc innermost position, the pickup feeding locking means is held on the locking removal side, and when the optical pickup is located at the disc inner-rim side position and outside the disc inner-rim side position as radially viewed, the pickup feeding locking means is released and locks the select member at a pickup feeding position by the pickup feeding locking means.

26. The disc player according to claim 24, wherein the detecting element is a detecting switch pressed by the optical pickup when the optical pickup is within a range from the disc innermost position to the disc inner-rim side position, and the detecting switch is separated from the optical pickup when the optical pickup moves outside the disc inner-rim position as radially viewed.

27. The disc player according to claim 23, wherein the pickup feeding mechanism includes a lead screw engaged with one end of the optical pickup to rectilinearly moves the optical pickup, and the detecting element is disposed on the opposite end of the optical pickup.

* * * * *